United States Patent
Maeng et al.

(10) Patent No.: US 8,356,083 B2
(45) Date of Patent: Jan. 15, 2013

(54) SYSTEM AND METHOD FOR TRANSMITTING AND RECEIVING A CALL ON A HOME NETWORK

(75) Inventors: Je-Young Maeng, Suwon-si (KR); Se-Hee Han, Seoul (KR); Fei Fei Feng, Suwon-si (KR); Dong-Shin Jung, Suwon-si (KR); Joo-Yeol Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 505 days.

(21) Appl. No.: 12/541,492

(22) Filed: Aug. 14, 2009

(65) Prior Publication Data

US 2010/0040211 A1 Feb. 18, 2010

(30) Foreign Application Priority Data

Aug. 14, 2008 (KR) .................. 10-2008-0080192
Apr. 3, 2009 (KR) .................. 10-2009-0029142

(51) Int. Cl.
*G06F 15/16* (2006.01)
(52) U.S. Cl. ..... 709/218; 709/229; 709/230; 379/93.14; 725/134
(58) Field of Classification Search .................. 370/235; 379/93.15, 88.13, 93.14; 709/218, 229, 230; 725/134
See application file for complete search history.

(56) References Cited

U.S. PATENT DOCUMENTS

| 2006/0153072 | A1 | 7/2006 | Bushmitch et al. | |
|---|---|---|---|---|
| 2006/0199621 | A1 | 9/2006 | Stirbu et al. | |
| 2007/0198669 | A1 | 8/2007 | Convertino et al. | |
| 2007/0200920 | A1 | 8/2007 | Walker et al. | |
| 2008/0008114 | A1 | 1/2008 | Kaarela et al. | |
| 2008/0031136 | A1* | 2/2008 | Gavette et al. | 370/235 |
| 2008/0050096 | A1* | 2/2008 | Ryu | 386/99 |
| 2009/0287794 | A1* | 11/2009 | Saaranen et al. | 709/219 |
| 2011/0103571 | A1 | 5/2011 | Astic et al. | |

FOREIGN PATENT DOCUMENTS

| JP | 2008-530928 | 8/2008 |
|---|---|---|
| KR | 1020050076966 | 7/2005 |

* cited by examiner

*Primary Examiner* — Gerald Gauthier
*Assistant Examiner* — Simon King
(74) *Attorney, Agent, or Firm* — The Farrell Law Firm, P.C.

(57) ABSTRACT

A system and method for transmitting/receiving a call on a home network. When a request for call transmission/reception is made, a CP selects a target electronic device to/from which to transmit/receive a call from among at least one electronic device, establishes a connection for call transmission/reception between a terminal and the selected target electronic device, and controls the call transmission/reception between the terminal and the selected target electronic device.

22 Claims, 19 Drawing Sheets

SYSTEM AND METHOD FOR TRANSMITTING AND RECEIVING A CALL ON A HOME NETWORK

PRIORITY

This application claims priority to applications filed in the Korean Industrial Property Office on Aug. 14, 2008 and Apr. 3, 2009, and assigned Serial Nos. 10-2008-0080192 and 10-2009-0029142, respectively, the contents of which are incorporated herein by reference.

BACKGROUND OF THE INVENTION

1. Field of the Invention

The present invention relates generally to a home network, and more particularly to a system and method for transmitting and receiving a call on a home network by using UPnP (Universal Plug and Play).

2. Description of the Related Art

In general, a home network is created using an Internet protocol (IP)-based private network. Such a home network connects and controls various devices, such as all kinds of Personal Computers (PCs), intelligent appliances, and wireless devices, to a single network through a common virtual computing environment, often referred to as "middleware". Middleware enables various devices to communicate with each other by interconnecting them in a peer-to-peer manner. Some of the middleware proposed to date includes Home Audio/Video (AV) Interoperability (HAVI), Universal Plug and Play (UPnP), Java intelligent network infrastructure (Jini), and Home wide web (HWW).

Among these and others, a UPnP network is currently the most widely used home network technology, and defines a UPnP device, a UPnP service, and a protocol between the UPnP device and the UPnP service.

The UPnP network includes Controlled Devices (CDs) that are home network devices connected to and controlled by an IP-based home network, and a Control Point (CP), which is a device for controlling the CDs.

The CP transmits a request for an event to each of the CDs, and receives the requested event from each of the CDs. Each of the CDs then performs a given function at the request of the CP. If the state of a CD changes, the CD transmits a requested event to the CP having requested the event.

The UPnP devices perform advertisement, discovery, description, control, and eventing processes. More specifically, in the advertisement process, a new CD is connected to a home network, and advertises its existence to other devices on the home network. In the discovery process, a new CP is connected to the home network, and searches CDs operating on the home network. In the description process, the CP determines the functions of newly added devices by parsing service description Extensible Markup Language (XML) files or device description XML files through IP addresses of the searched CDs in order to control the CDs. In the control process, when the CP is to provide a specific service through a CD, it transmits an action request for the specific service to the corresponding CD, using Simple Object Access Protocol (SOAP) according to the UPnP Device Architecture (UDA), and receives a result (variable value) in response to the transmitted action request. Additionally, the eventing process checks the information change state of the CD that has provided the specific service at the CP's control command.

Based on the above UPnP network technology, UPnP AV technology has been developed, which enables enjoyment of multimedia contents, such as music, video, movie, etc. For more reference, the UPnP AV technology is described in the UPnP AV specification.

According to the UPnP AV specification, the UPnP AV architecture includes a media server for providing a multimedia file through a Content Directory Service (CDS), a media renderer for rendering the provided multimedia file, and a CP for controlling the media sever and the media renderer to interact with each other. The CDS is an embedded service of the media server, and provides the CP with metadata of contents that exist inside or outside of a home network and are stored in the media server. The CP identifies the metadata provided from the CDS, and requests the media renderer to render the identified metadata. Accordingly, when a terminal exists on a home network, the corresponding terminal retransmits calls, which are transmitted to the terminal through a Video and Voice Over IP (VVOIP) and a mobile communication system, into the home network, using the above UPnP AV architecture.

However, because the conventional UPnP AV architecture was developed for searching, moving, and synchronizing contents on a home network, it has a problem in controlling various call control signals used in a telephone call system. In addition, because the conventional UPnP AV architecture does not include an answering feature and a Short Messaging Service (SMS) writing or sending function, it is incapable of using these functions.

Further, because the conventional UPnP AV architecture is used in transmission of AV contents, it includes parts that are unnecessary when call voice and video are transmitted.

SUMMARY OF THE INVENTION

Accordingly, the present invention has been designed to solve at least the above-mentioned problems occurring in the prior art, and provides a system, server, client, and method for transmitting and receiving a call on a home network.

In accordance with an aspect of the present invention, there is provided a system for transmitting and receiving a call on a home network. The system includes a terminal for transmitting and receiving, or controlling a call; at least one electronic device for receiving or transmitting a call from or to the terminal; and a Control Point (CP) for selecting a target electronic device to or from which to transmit or receive a call from among the at least one electronic device and the terminal, establishing a connection for call transmission or reception between the selected terminal and target electronic device, and then controlling the call transmission or reception between the terminal and the target electronic device for which the connection for call transmission or reception is established.

In accordance with another aspect of the present invention, there is provided a method of transmitting and receiving a call in a home network system including a terminal, at least one electronic device, and a Control Point (CP). The method includes: when a request for call transmission or reception is made, selecting a target electronic device to or from which to transmit or receive a call from among the at least one electronic device, and the terminal by the CP; establishing a connection for call transmission or reception between the selected terminal and target electronic device by the CP; and controlling the call transmission or reception between the terminal and the target electronic device, for which the connection for call transmission or reception is established, by the CP.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
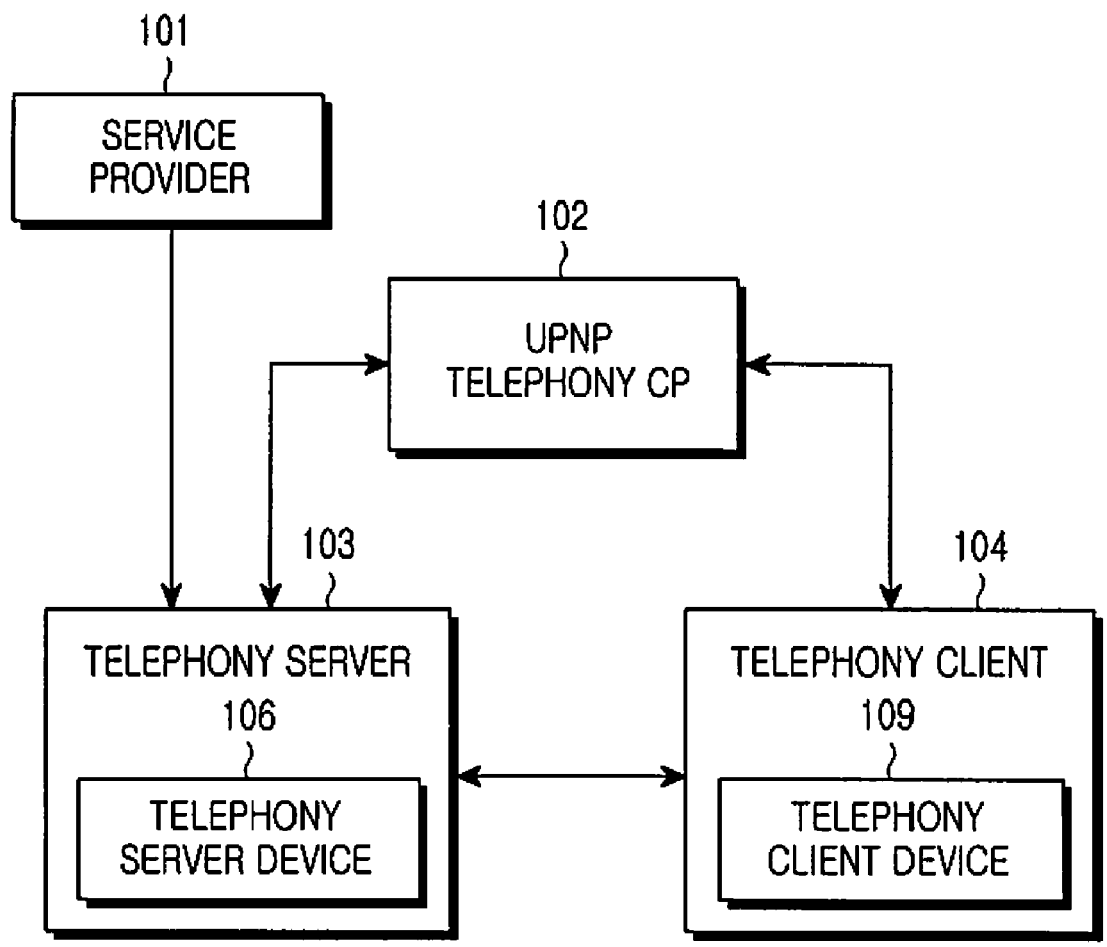
FIG. 1 is a block diagram illustrating a home network system in accordance with an embodiment of the present invention.

Hereinafter, embodiments of the present invention will be described with reference to the accompanying drawings. Throughout the drawings, similar components are designated by similar reference numerals although they are illustrated in different drawings.

Also, in the following description, a detailed description of known functions and configurations incorporated herein will be omitted when it may obscure the subject matter of the present invention. Further, it should be noted that only parts essential for understanding the operations according to the present invention will be described and a description of parts other than the essential parts will be omitted in order not to obscure the present invention.

FIG. 1 illustrates a home network system according to an embodiment of the present invention.

Referring to FIG. 1, a home network system includes a service provider 101, a UPnP telephony Control Point (UPnP telephony CP) 102, a telephony server 103, and a telephony client 104. The service provider 101 provides a telephony service, and provides the telephony server 103 with an interface for call transmission and reception.

The UPnP telephony CP 102 is a logical module for controlling a telephony server device 106 and a telephony client device 109 using UPnP Action. More specifically, the UPnP telephony CP 102 determines media, a protocol, and a transport format, which are to be used for call transmission and reception, using the capability information of a call data transfer agent included in the telephony server 103 or the telephony client 104, which is transmitted from the telephony server 103. Also, the UPnP telephony CP 102 generates a profile in which the determined media, protocol, and transport format are defined, and transmits it to the telephony server 103 or the telephony client 104, thereby setting the environment of the call data transfer agent included in the telephony server 103 or the telephony client 104.

The UPnP telephony CP 102 may be included in the telephony server 103, the telephony client 104, or an apparatus, such as a PC or a Personal Digital Assistant (PDA). If the UPnP telephony CP 102 is included inside the telephony server 103 or the telephony client 104, then it can directly control the telephony server device 106 or the telephony client device 109 without using UPnP Action.

The telephony server 103 is a physical apparatus that includes a Computer Engineering (CE) apparatus, such as a cellular phone or a telephone, and VoIP consisting of software. The telephony server 103 includes the telephony server device 106, also consisting of software. The telephony server 103 controls call transmission and reception using the service provider 101 and an interface provided by the corresponding service provider 101.

The telephony client 104 refers to a CE apparatus capable of inputting and outputting a user voice or image, such as a mobile communication terminal or a video phone, and a physical apparatus, such as a PC or a TeleVision (TV). The telephony client 104 includes the telephony client device 109, which can consist of software. Using such a home network system, a user can conveniently transmit and receive a call indoors.

Figure 2:
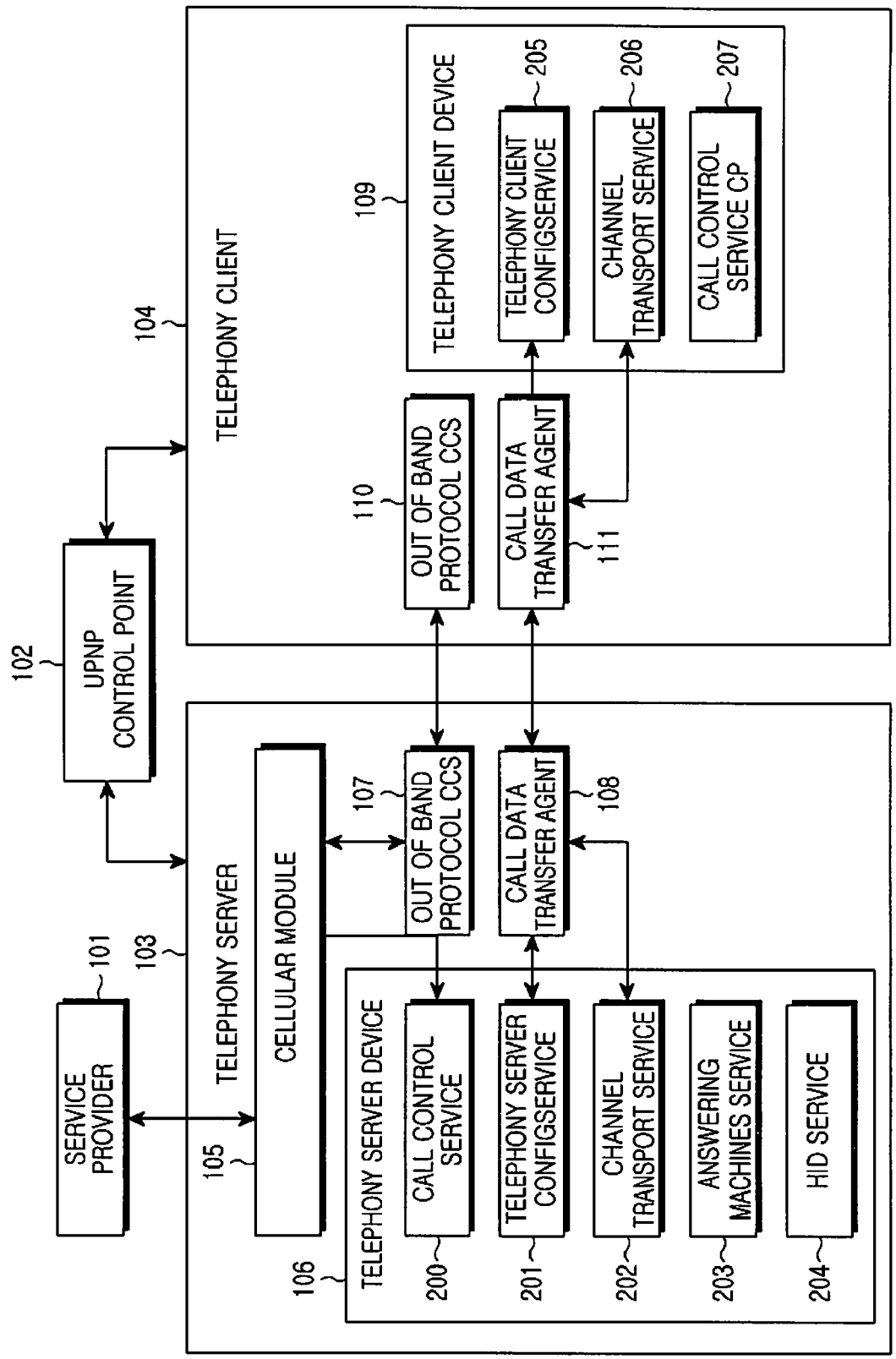
FIG. 2 is a block diagram illustrating a detailed structure of a home network system in accordance with an embodiment of the present invention.

FIG. 2 illustrates a detailed structure of a home network system according to an embodiment of the present invention.

Referring to FIG. 2, the telephony server 103 includes a cellular module 105, the telephony server device 106, an out of band protocol Call Control Service (out of band protocol CCS) 107, and a call data transfer agent 108.

The cellular module 105 includes typical terminal components constituting a terminal. The cellular module 105 accesses a cellular network, transmits a call transmission request, a response to a call reception request, and call data, and also performs various services provided by the service provider 101. In accordance with an embodiment of the present invention, the cellular module 105 may be substituted by any module, such as VoIP, which is connected to the service provider 101 and provides a telephony service.

The telephony server device 106 includes a CCS 200, a telephony server ConfigService 201, a channel transport service 202, an answering machine service 203, and a Human Interface Device (HID) service 204. More specially, the CCS 200 controls the cellular model 105 to transmit a call transmission request, a response to a call reception request, and call data.

The telephony server ConfigService 201 enables the UPnP telephony CP 102 with the call data transfer agent 108 included in the telephony server 103 or the telephony client 104 in order to synchronize a data transfer protocol between the telephony server 103 and the telephony client 104. The telephony server ConfigService 201 receives a profile, in which capability information to actually be used is recorded, from the UPnP telephony CP 102, and stores the received profile. Such a profile includes a unique identifier of the telephony server 103 or the telephony client 104, which is used when a call is transmitted or received.

The channel transport service 202 sets transmission and reception information for call data transmission and reception between the telephony server 103 and the telephony client 104. The information set by the channel transport service 202 may vary depending on a protocol defined in the profile. For example, when a protocol defined in the profile is HyperText Transfer Protocol (HTTP) on Transmission Control Protocol (TCP)/IP based on Ethernet, the set information may be Uniform Resource Locator (URL) capable of bidirectional call data transmission and reception.

When a plurality of telephony servers 103 or telephony clients 104 exist on the home network, if a user selects a telephony server 103 and a telephony client 104 for a communication connection, then the channel transport service 202 transmits information on the selected telephony server 103 and telephony client 104 to the telephony client 104. Thus, the channel transport service 202 initiates call data transmission and reception between the selected telephony server 103 and telephony client 104.

The answering machine service 203 provides enables the telephony client 104 to set or use an answering feature of the telephony server 103. When user voice data is received from a call data transfer agent in the telephony client 104, the answering machine service 203 stores the received voice data. Also, the answering machine service 203 previously stores information on call data that the telephony client 104 has not received, such as an absent subscriber message, and controls the call data transfer agent to transmit the stored call data information. Accordingly, even when a call is received while voice data is stored through the answering machine service 203, an embodiment of the present invention enables the telephony client 103 to suspend storing voice data, and then receive the call.

The HID service 204 is used when the telephony client 104 has no input apparatus for inputting a text. The HID service 204 defines and sets an input type for an input apparatus, and then transfers input values to the telephony client 104.

The above-described telephony server device 106 may also not include the answering machine service 203 and the HID service 204, and may include only the other services.

The out of band protocol CCS 107 performs call control using remote User Interface (UI) protocol technology, such as Consumer Electronics Association (CEA) 2014 and eXtended Remoting Technology (XRT), or Session Initiation Protocol (SIP) technology, not using a UPnP protocol.

The call data transfer agent 108 controls call data transmission and reception between the telephony server 103 and the telephony client 104. The call data transfer agent 108 transmits and receives call data using defined transport media, a defined protocol, and a defined transport format. Here, transport media, a protocol, and a transport format used by the call data transfer agent 108 are not limited to a specific technology.

The call data transfer agent 108 changes received call data to a format that can be used by the cellular module 105, and transfers the call data, which is changed to the format, to the cellular module 105. Accordingly, in accordance with an embodiment of the present invention, it is possible to transmit and receive call data between the telephony server 103 and the telephony client 104.

For example, when a protocol defined in the profile is HTTP on TCP/IP based on Ethernet, if transmission and reception information set in the channel transport service 202 is URL capable of bidirectional call data transmission and reception, then the call data transfer agent 108 can transmit and receive call data using URL.

The telephony client 104 includes the telephony client device 109, an out of band protocol CCS 110, and a call data transfer agent 111. These components included in the telephony client 104 have the same operations as those of the components included in the telephony server 103, which have been described above along with the telephony server 103. Accordingly, a repetitive detailed description thereof will be omitted.

However, the telephony client device 109 includes a call control service CP 207 that is not included in the telephony server device 106. The call control service CP 207 controls the cellular module 105 by controlling the CCS 200 of the telephony server device 106, through which it transmits information regarding a call to the service provider 101.

Figure 3:
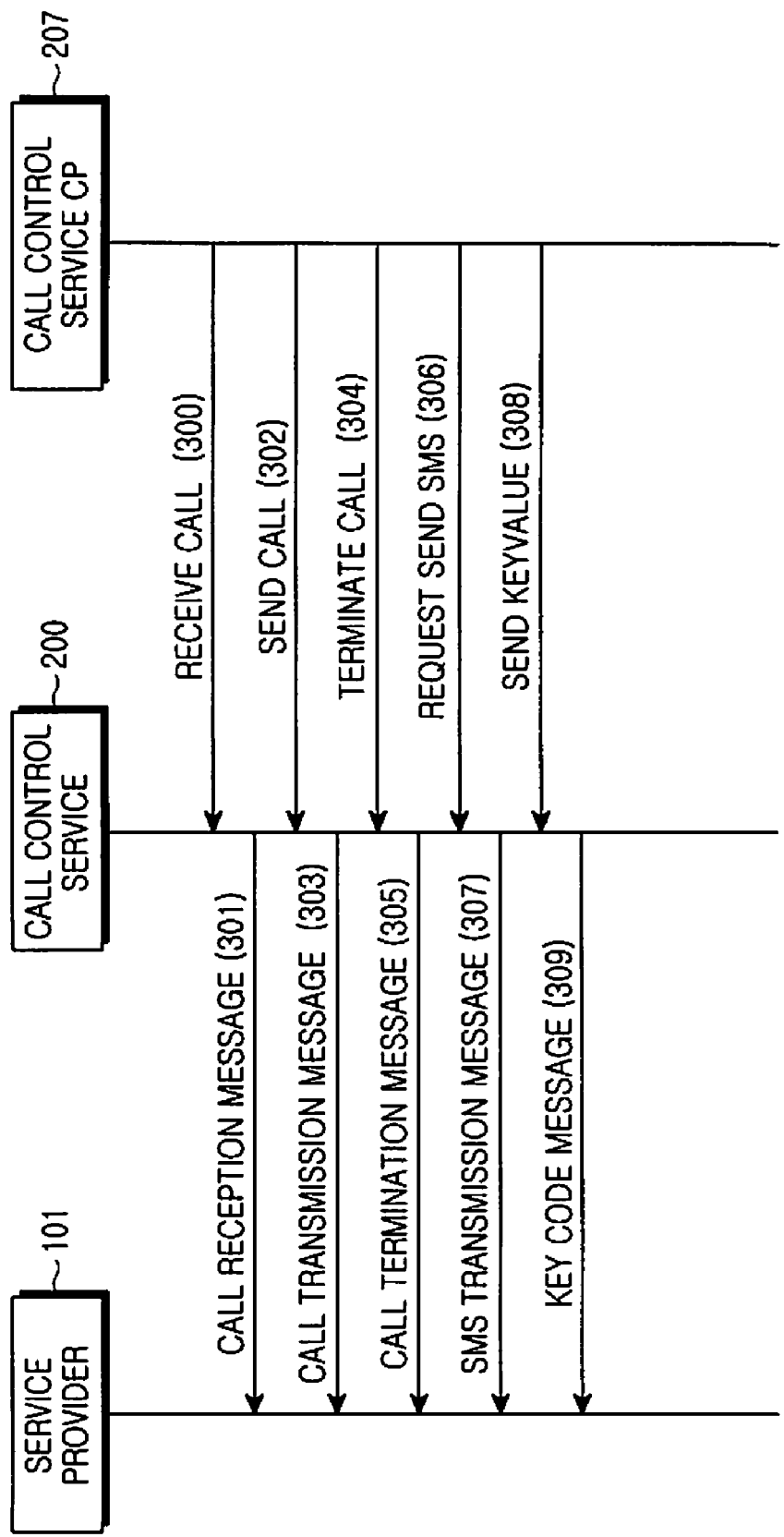
FIG. 3 is a view illustrating call control signals in accordance with an embodiment of the present invention.

FIG. 3 illustrates call control signals that are transmitted from the call control service CP 207 to the CCS 200 and then the service provider 101, in order to control the cellular module 105, according to an embodiment of the present invention.

Referring to FIG. 3, ReceiveCall( ) 300 is UPnP Action indicating that a call is received while outputting voice data for reporting call reception, when the call is received. The call control service CP 207 transmits ReceiveCall( ) 300 to the CCS 200 using an interface provided by the service provider 101. Subsequently, the CCS 200 generates a call reception message 301, which it transmits to the service provider 101, and then transmits call data, which is received from the service provider 101, to the telephony client 104 via the call data transfer agent 108.

SendCall( ) 302 is UPnP Action for indicating that a call is transmitted and for transmitting a telephone number of a terminal of a called party to which to transmit the call, together with the call. The call control service CP 207 transmits SendCall( ) 302 to the CCS 200 using an interface provided by the service provider 101. Subsequently, the CCS 200 generates a call transmission message 303, which it transmits to the service provider 101, and then transmits call data, which is received from the telephony client 104, to the service provider 101. With regard to this, even when the call is not connected to the terminal of the called party, the call data transfer agent 108 may transmit transmission sound data to the service provider 101.

TerminateCall( ) 304 is UPnP Action indicating that call transmission or reception is terminated. The call control service CP 207 transmits TerminateCall( ) 304 to the CCS 200 using the interface provided by the service provider 101. Subsequently, the CCS 200 generates a call transmission or reception termination message 305, transmits it to the service provider 101, and then terminates call data transmission or reception.

RequestSendSMS( ) 306 is UPnP Action for transmitting an SMS message and simultaneously informing that the SMS message is transmitted. The call control service CP 207 transmits RequestSendSMS(message) 306 including an SMS message to the CCS 200 using the interface provided by the service provider 101. Subsequently, the CCS 200 generates an SMS transmission message 307, and transmits it to the service provider 101.

Sendkeyvalue( ) 308 is UPnP Action for transferring key values that are generated in order to use various Advance Routing Services (ARSs). The call control service CP 207 transmits Sendkeyvalue(keycode) 308 including a key value, which is input through a user, to the CCS 200, using the interface provided by the service provider 101. Subsequently, the CCS 200 generates a key code message 309, and transmits it to the service provider 101.

As described above, the call control service CP 207 is advantageous in that it can control the cellular module 105 using various UPnP Actions.

For call transmission and reception, the UPnP telephony CP 102 makes a communication connection by establishing a call transmission or reception setup between the telephony server device 106 and the telephony client device 109, which will be discussed in more detail below with reference to FIG. 4.

Figure 4:
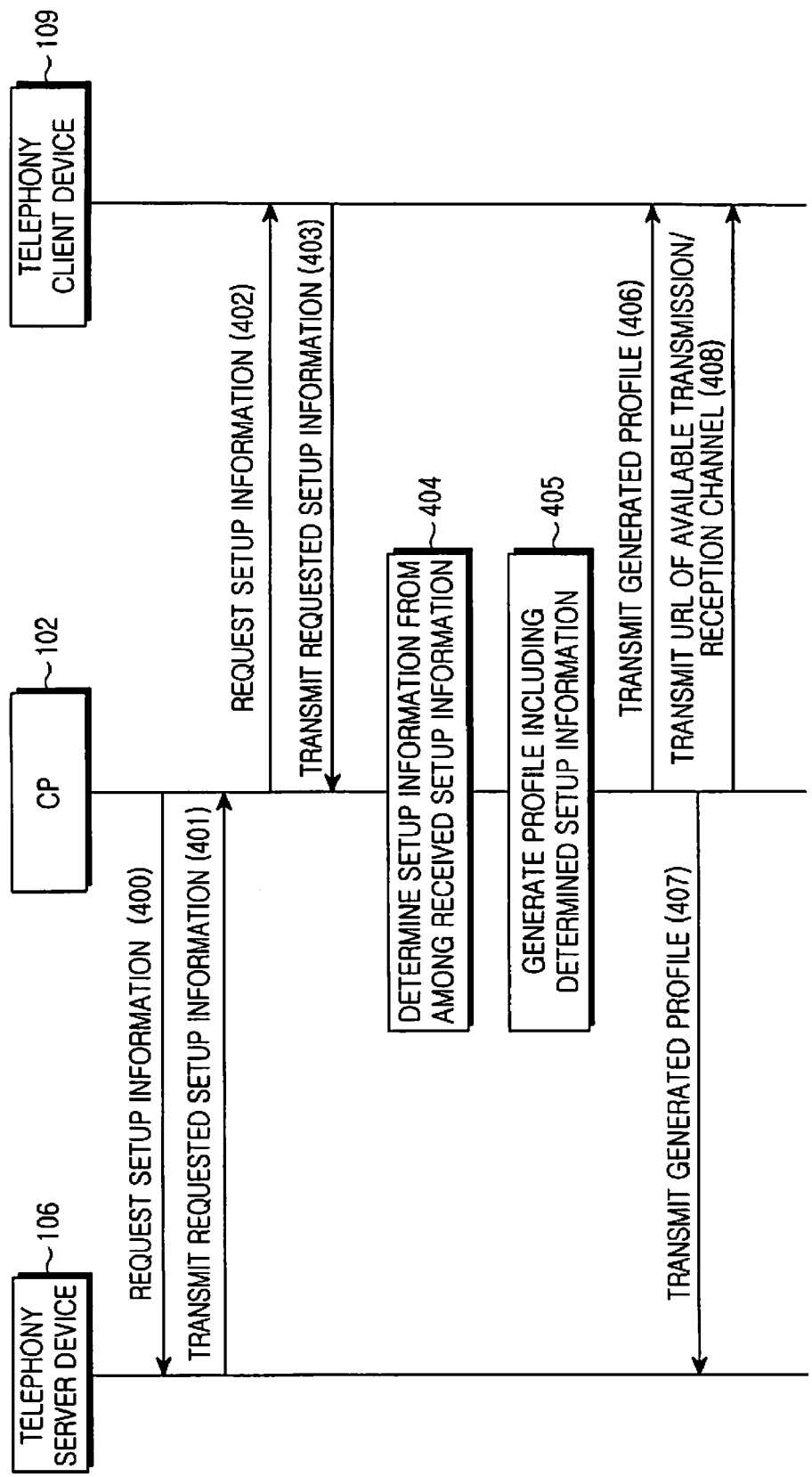
FIG. 4 is a control flowchart illustrating a procedure of establishing a call transmission/reception setup between a server and a client in accordance with an embodiment of the present invention.

FIG. 4 illustrates a procedure of establishing a call transmission and reception setup between the telephony server 103 and the telephony client 104 according to an embodiment of the present invention.

In step 400, the CP 102 transmits a request for transmitting setup information including a protocol, a file format, and an available call control scheme, which is provided by the telephony server 103, to the telephony server device 106 through the telephony server ConfigService 201 of the telephony server device 106 using UPnP Action, such as GetServerProtocolInfo( ).

In step 401, the telephony server device 106 transmits the requested setup information to the CP 102.

In step 402, the CP 102 transmits a request for transmitting setup information including a protocol, a file format, and an available call control scheme, which is provided by the telephony client 104, to the telephony client ConfigService 205 of the telephony client device 109 using UPnP Action, such as getClientProtocolInfo( ).

In step 403, the telephony client device 109 transmits the requested setup information to the CP 102.

In step 404, the CP 102 determines setup information to be used for call transmission and reception from among the setup information received from the telephony server device 106 and the telephony client device 109. For example, the CP 102 may determine the setup information to be used for call transmission and reception according to a user determination, based on a policy preset by a user, or a preset default.

In step 405, the CP 102 generates a profile including the determined setup information.

In step 406, the CP 102 transmits the generated profile to the telephony client ConfigService 205 of the telephony client device 109 using UPnP Action, such as AddProfile( ).

In step 407, the CP 102 transmits the generated profile to the telephony server ConfigService 201 of the telephony server device 106 using UPnP Action, such as AddProfile( ).

In step 408, the CP 102 connects a session to the telephony client 104, thereby generating a reception channel and a transmission channel, and transmits URL, which can be used in the generated transmission and reception channel, to the channel transport service 206 of the telephony client 104 using UPnP Action, such as SetURL(send, receive). As a result, the above-described embodiment of the present invention is advantageous in that the above-generated profile can be transmitted to the telephony server 103 or the telephony client 104, even when a session is connected using other information than the transmitted URL.

Accordingly, the CP 102 establishes a call transmission and reception setup between the telephony server 103 and the telephony client 104. Of course, if a call transmission and reception setup is established and a profile is generated in advance, then the above procedure of establishing a call transmission and reception setup may be omitted.

A call transmission and reception setup may be established when a call transmission and reception request is made, or may be previously established before a call transmission and reception request is made. That is, when a new telephony server or a new telephony client enters a home network, an IP is newly provided to each server or client even in a state where a call transmission and reception setup has been completed. Therefore, the telephony server or the telephony client newly establishes a call transmission and reception setup. When a call transmission and reception setup is newly established, a user may select a server or client for call transmission and reception, or may select whether or not to use a previously set profile. Such a call transmission and reception setup may also be automatically established according to a preset policy.

Figure 5:
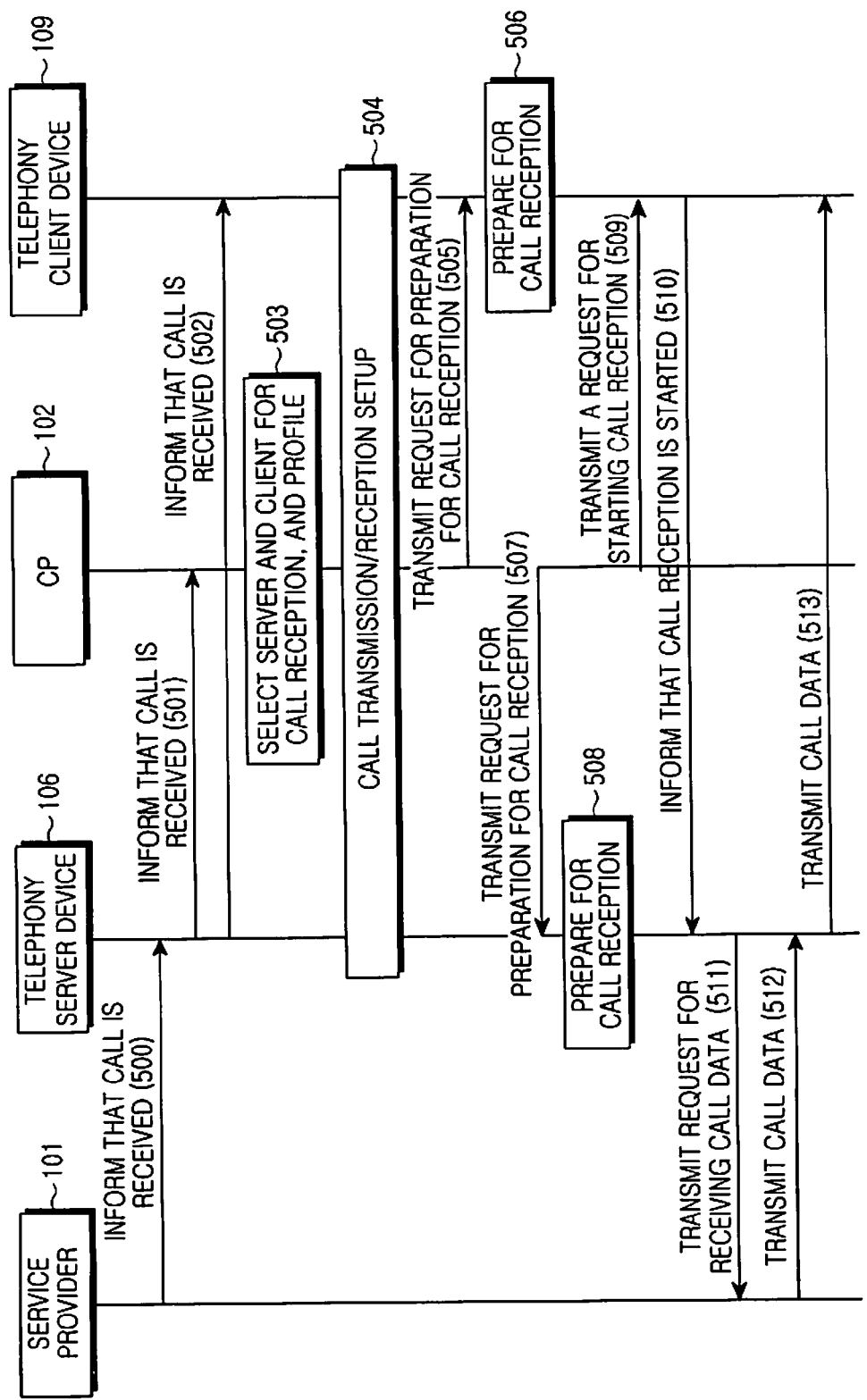
FIG. 5 is a control flowchart illustrating a procedure of establishing a call transmission/reception setup between a server and a client, after a call is received, and then receiving the call in the home network system in accordance with an embodiment of the present invention.

FIG. 5 illustrates a procedure of establishing a call transmission and reception setup between the telephony server 103 and the telephony client 104, after a call is received, and then receiving a call in a home network system according to an embodiment of the present invention.

Referring to FIG. 5, upon receiving a call from the outside, the service provider 101 informs the telephony server device 106 of the reception of the call in step 500. In step 501, the telephony server device 106 informs the CP 102 of the reception of the call using a UPnP event mechanism defined in the UPnP device architecture.

In step 502, the telephony server device 106 informs the telephony client device 109 of the reception of the call using a UPnP event mechanism defined in the UPnP device architecture. In addition to the UPnP event mechanism defined in the UPnP device architecture, the telephony server device 106 may inform the CP 102 and the telephony client device 109 of the reception of the call using a unicast event mechanism or a multicast event mechanism that is also defined in a UPnP device architecture. While informing the telephony client device 109 of the reception of the call, the telephony server device 106 transmits the telephone number of a call sender to the telephony client device 109. Thus, the telephone number of the call sender can be displayed on the screen of the telephony client device 109.

In step 503, the CP 102 selects a telephony server and a telephony client, which are to receive the call, from among a plurality of telephony servers and telephony clients existing on the home network, and selects a profile for receiving the call between the selected server and client. For example, the process of selecting a server and a client, which are to receive the call, may be automatically performed according to a preset policy.

In step 504, the CP 102 establishes a call transmission and reception setup between the selected server and client. Such a call transmission and reception setup is established as described above.

In step 505, the CP 102 activates the call data transfer agent 111 of the telephony client 104 through the channel transport service 206 of the telephony client device 109 using UPnP Action, such as CallInitiate( ), thereby requesting the telephony client device 109 to get ready for the reception of the call data. In step 506, the telephony client device 109 gets ready for the reception of the call data by performing an operation of preparing a file to be transmitted when the call is received or opening a communication port.

In step 507, the CP 102 activates the call data transfer agent 108 of the telephony server 103 through the channel transport service 202 of the telephony server device 106 using UPnP Action, such as CallInitiate( ), which requests the telephony server device 106 prepare for reception of the call data. In step 508, the telephony server device 106 prepares for reception of the call data by preparing a file to be transmitted when the call is received or opening a communication port, as described above.

In step 509, the CP 102 transmits a request for starting receiving the call to the telephony client device 109 through the channel transport service 206 of the telephony client device 109 using UPnP Action, such as StartCalldelivery( ). This request may not be made according to a policy preset by a user. For example, a user may not transmit a request for starting the reception of the call to the telephony client device 109 via the CP 102, but directly starts receiving the call using the telephony client device 109.

In step 510, the call control service CP 207 of the telephony client device 109 informs the telephony server device 106 of the start of receiving the call using ReceiveCall( ) Action, as illustrated in FIG. 4. Here, the telephony client device 109 may transmit a message for reporting the start of receiving the call to the telephony server device 106 using a call control protocol under instructions from a user. In addition to UPnP Action, the telephony client device 109 may also transmit a message to the telephony server device 106 using a remote UI protocol, such as CEA 2014 and XRT, or an SIP protocol, which has been described in connection with the out of band protocol CCS 107.

In step 511, the telephony server device 106 requests the service provider 101 to receive the call data.

In step 512, when the service provider 101 transmits the call data, the telephony server device 106 transmits the received call data to the telephony client device 109 in step 513. That is, the telephony server device 106 streams the call data using an out of band protocol.

Subsequently, if a request for terminating the reception of the call is transmitted from a user, then the telephony client device 109 requests the CP 102 to terminate the reception of the call, and in turn, the CP 102 requests the telephony server device 106 to terminate the reception of the call. The telephony server device 106 then terminates the reception of the call data.

The embodiment of the present invention as described above provides an advantage in that a user can select a server and a client, which are to receive a call, using the CP 102, and establish a call transmission and reception setup between the selected server and client. Accordingly, this enables the telephone number of a call sender to be displayed on a screen when a call is received. However, other information regarding the call sender, such as his/her name, profile, and schedule, may be also displayed on the screen.

Figure 6:
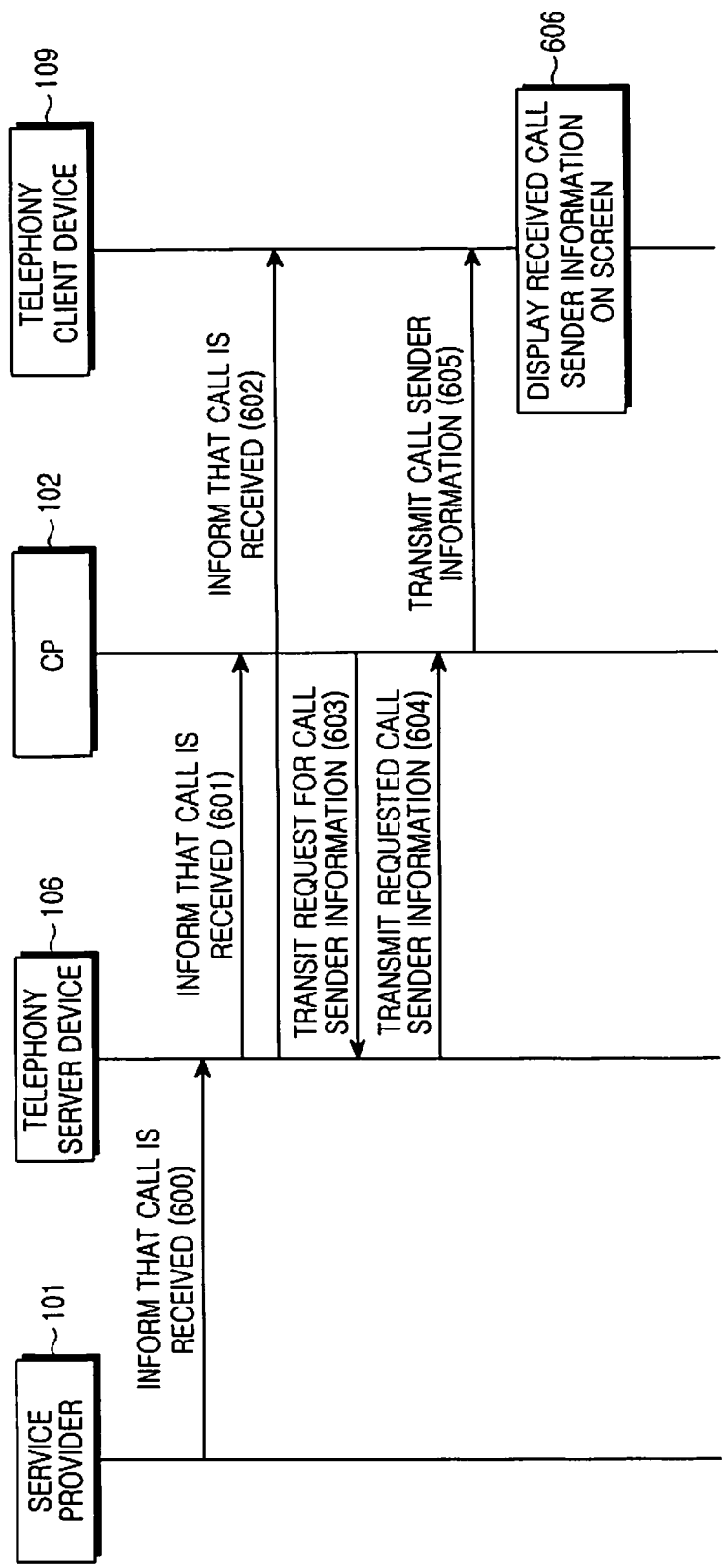
FIG. 6 is a control flowchart illustrating a procedure of displaying call originator-related information on a client screen when a call is received in accordance with an embodiment of the present invention.

FIG. 6 illustrates a procedure of displaying information regarding a call sender on a screen of the telephony client 104, when a call is received according to an embodiment of the present invention.

Referring to FIG. 6, in step 600, the service provider 101 informs the telephony server device 106 of the reception of a call. In step 601, the telephony server device 106 informs the CP 102 of the reception of the call, and in step 602, the telephony server device 106 informs the telephony client device 109 of the reception of the call.

In step 603, the CP 102 transmits a request for transmitting information regarding a call sender to the telephony server device 106 using UPnP Action, such as GetSenderInformation( ). Here, the information regarding a call sender refers to information including the name, telephone number, profile, and schedule of the call sender.

In step 604, the telephony server device 106 searches for the information regarding the call sender, and transmits the searched information to the CP 102.

In step 605, the CP 102 transmits the received information regarding the call sender to the telephony client device 109 using UPnP Action, such as GetSenderInformation( ).

In step 606, the telephony client device 109 displays the received information regarding the call sender on a screen thereof. Subsequently, the same steps as step 503 to 513 in FIG. 5 are performed. This provides an advantage in that a user can recognize various information regarding a call sender together when a call is received.

Figure 7:
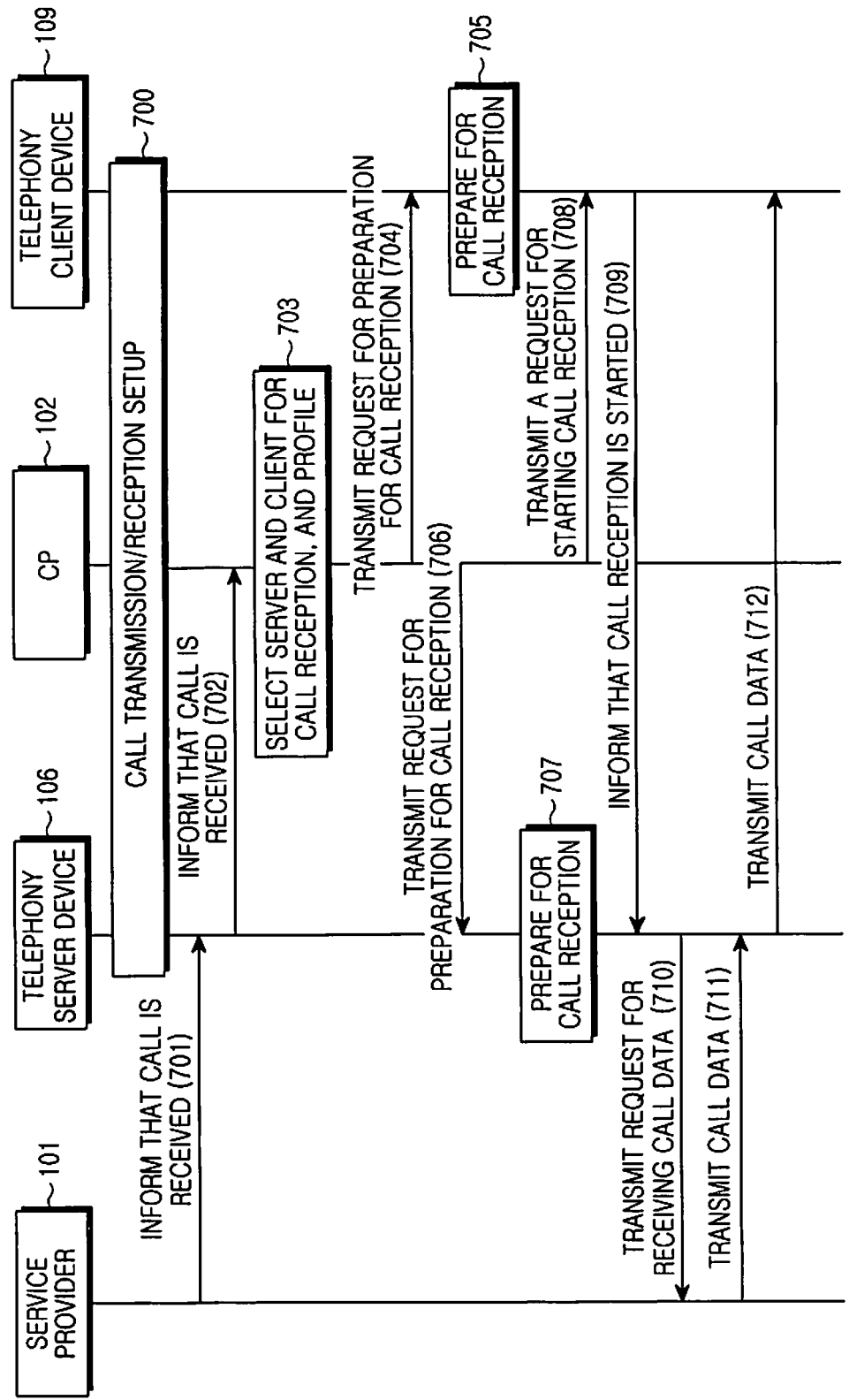
FIG. 7 is a control flowchart illustrating a procedure of establishing a call transmission/reception setup between a server and a client, before a call reception request is made, and then receiving a call in accordance with an embodiment of the present invention.

FIG. 7 illustrates a procedure of establishing a call transmission and reception setup, before a call reception request is made, and then receiving a call in the home network system according to an embodiment of the present invention.

Referring to FIG. 7, upon receiving a call from the outside, i.e., after call transmission and reception setup in step 700, the service provider 101 informs the telephony server device 106 of the reception of the call in step 701. In step 702, the telephony server device 106 informs the CP 102 of the reception of the call by using the UPnP event mechanism defined in the UPnP device architecture.

In step 703, the CP 102 selects a telephony server and a telephony client, which are to receive the call, from among a plurality of telephony servers and telephony clients for each of which a call reception setup is established on the home network, and selects a profile for receiving the call between the selected server and client. For example, the profile may be preset by a user, or may be set in advance to a default.

In step 704, the CP 102 transmits a request for preparing for reception of the call data to the telephony client 104 using UPnP Action, such as CallInitiate(profileID) including a profile ID for which a profile to be used for call reception is defined from among one or more profiles available to the selected server and client. In step 705, the telephony client device 109 prepares for reception of the call data.

In step 706, the CP 102 transmits a request for preparing for reception of the call data to the telephony server 103 using UPnP Action, such as CallInitiate(profileID) including a telephony server ID value for the selected profile. In step 707, the telephony server device 106 prepares for reception of the call data.

The operations in subsequent steps 708 to 712 are the same as those in steps 509 to 513 of FIG. 5, which were already described above. Accordingly, a repetitive detailed description thereof will be omitted here.

In the above procedure, the CP 102 establishes a call transmission and reception setup in advance, i.e., before a call reception request is made, and then a call is received between the telephony server device and the telephony client device.

Figure 8:
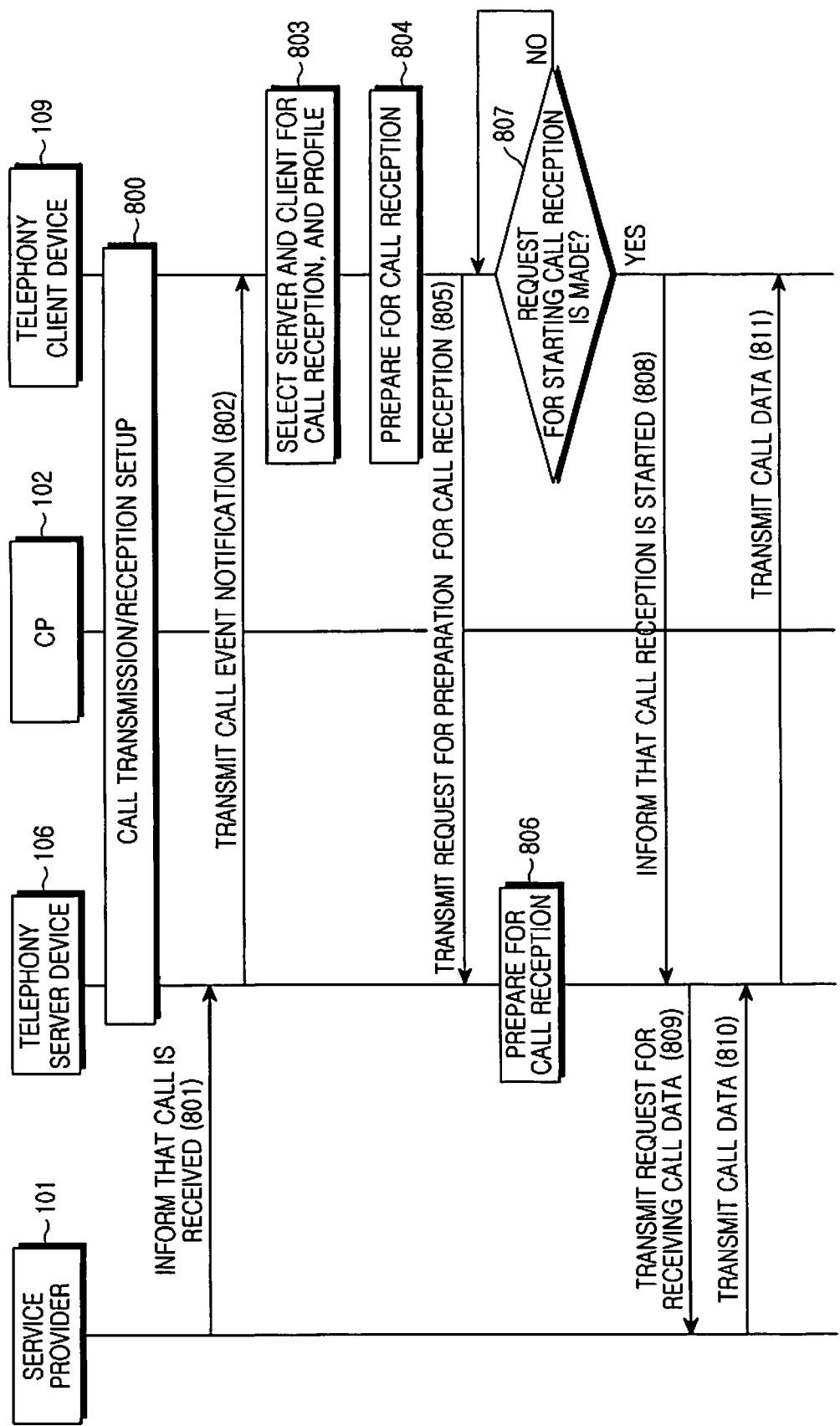
FIG. 8 is a control flowchart illustrating a procedure of establishing a call transmission/reception setup between a server and a client, before a call reception request is made, and then receiving a call between the server and the client, exclusive of a CP, in accordance with an embodiment of the present invention.

FIG. 8 illustrates a procedure of establishing a call transmission and reception setup, before a call reception request is made, and then receiving a call between the telephony server device 106 and the telephony client device 109, exclusive of the CP 102, on the home network according to an embodiment of the present invention.

Referring to FIG. 8, in step 800, the CP 102 establishes a call transmission and reception setup between the telephony server device 106 and the telephony client device 109. The call transmission and reception setup is established in a similar manner as described with reference to FIG. 5.

Subsequently, the CP 102 is excluded from the procedure of receiving a call, and the service provider 101 informs the telephony server device 106 of the reception of the call in step 801.

In step 802, the telephony server device 106 transmits an incoming call notification directly to the telephony client device 109 using a multicast mechanism, in order to inform the telephony client device 109 of the reception of the call.

In step 803, the telephony client device 104 selects a server and a client to receive the call, and selects a profile for receiving the call between the selected server and client.

In step 804, the telephony client device 109 prepares for the reception of the call. In step 805, the telephony client device 109 transmits call initiation notification to the telephony server device 106 using the multicast mechanism, thereby requesting the telephony server device 106 to prepare for reception of the call. For example, the telephony client device 109 may transmit a request for preparing for the reception of the call to the telephony server device 106 using a unicast mechanism or a UPnP Action, in addition to the multicast mechanism.

In step 806, the telephony server device 106 prepares for reception of the call.

In step 807, if a request for starting the reception of the call is made, then the telephony client device 109 informs the telephony server device 106 of starting the reception of the call in step 808. Otherwise, the telephony client device 109 continues to check if a request for starting the reception of the call is made.

The operations in subsequent steps 809 to 811 are the same as those in steps 511 to 513 of FIG. 5, which were described above. Accordingly, a repetitive detailed description thereof will be omitted here.

In the above-described procedure, a call is received between the telephony server device 106 and the telephony client device 109, exclusive of the CP 102. Here, the CP 102 is a logical component, and may exist in the same physical apparatus as the telephony server device 106 or the telephony client device 109. If the CP 102 exists in the same physical apparatus, then a process including a message transmitted using UPnP Action or a network protocol transmits the message using an internal function, and any other process employs the same scheme.

Figure 9:
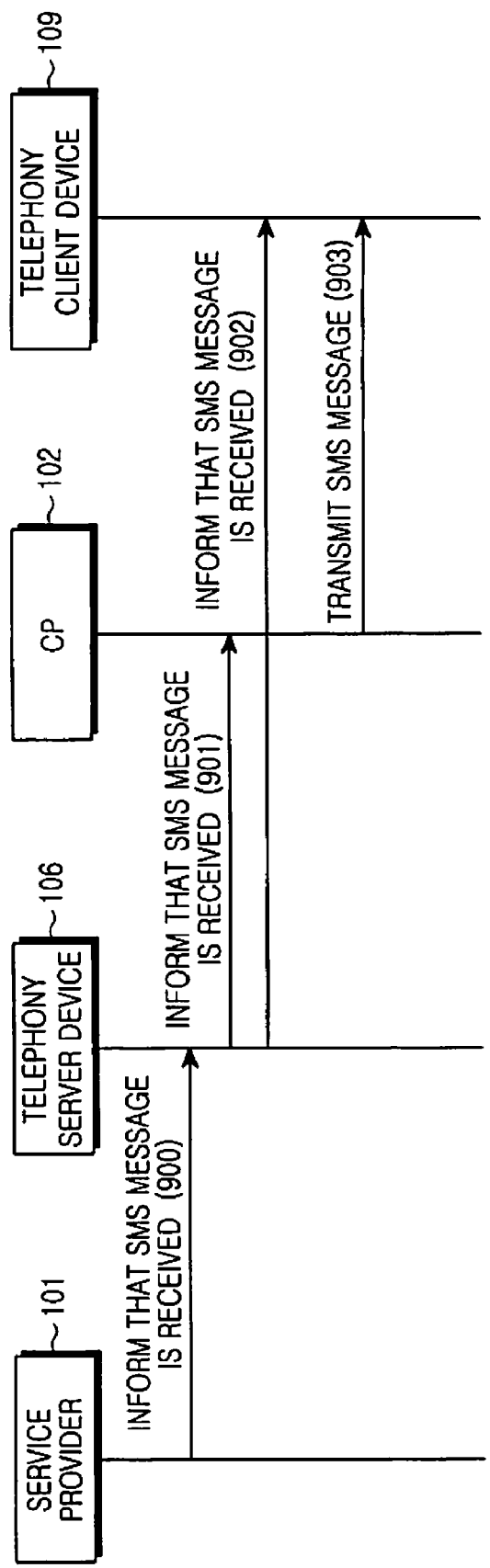
FIG. 9 is a control flowchart illustrating a procedure of receiving an SMS message in the home network system in accordance with an embodiment of the present invention.

FIG. 9 illustrates a procedure of receiving an SMS message in a home network system according to an embodiment of the present invention.

Referring to FIG. 9, upon receiving an SMS message, the service provider 101 informs the telephony server device 106 of the reception of the SMS message in step 900. The telephony server device 106 informs the CP 102 of the reception of the SMS message using a UPnP event mechanism in step 901, and informs the telephony client device 109 of the reception of the SMS message using the UPnP event mechanism in step 902. For example, the telephony server device 106 may inform the CP 102 and the telephony client device 109 of the reception of the SMS message using a unicast event mechanism or a multicast event mechanism.

In step 903, the CP 102 transmits SendSMS( ) to the telephony client device 109 using the unicast event mechanism, in order to transmit the SMS message. For example, the CP 102 may transmit the SMS message using the multicast event mechanism or UPnP Action, in addition to the unicast event mechanism.

Figure 10:
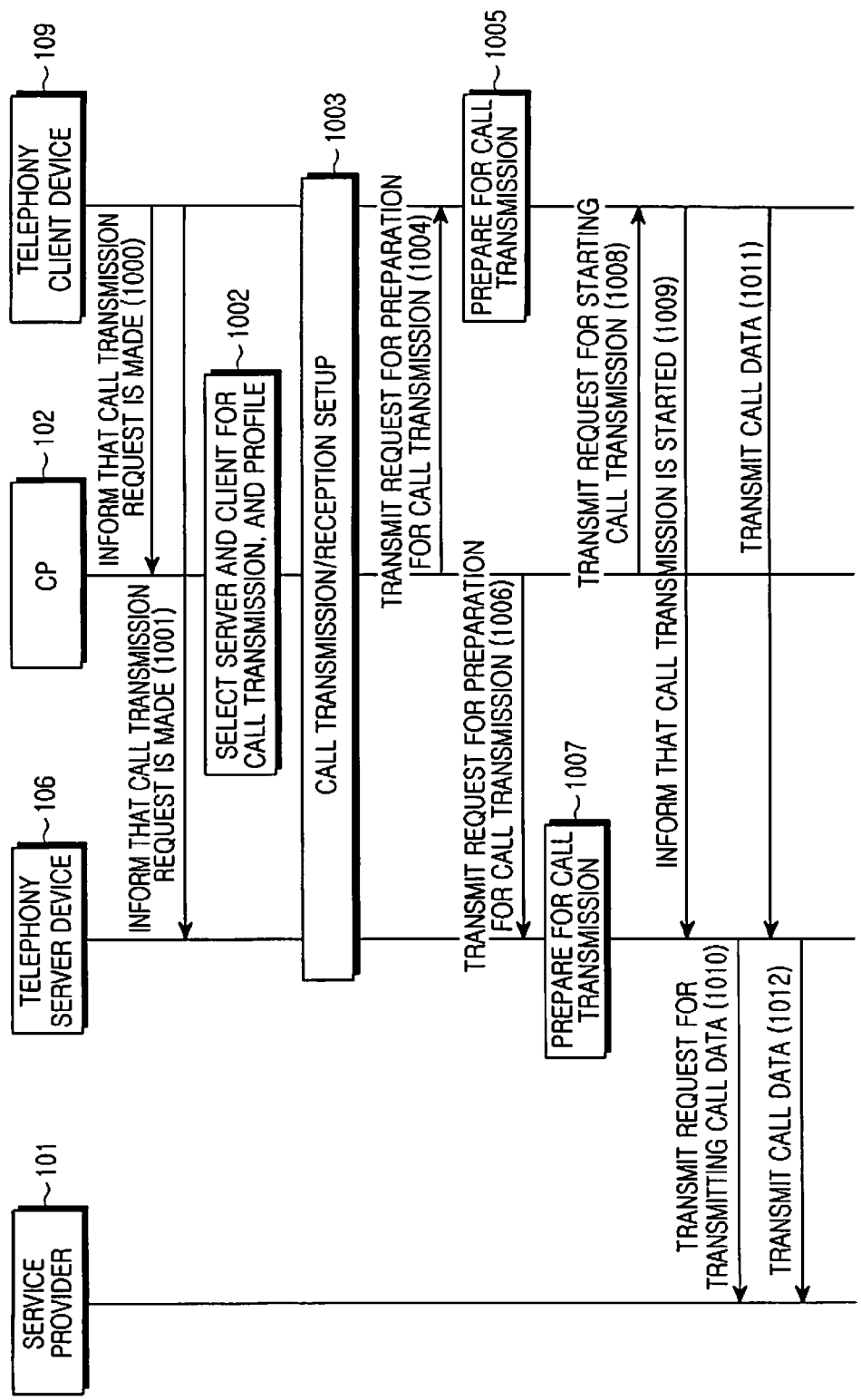
FIG. 10 is a control flowchart illustrating a procedure of establishing a call transmission/reception setup between a server and a client, after a call transmission request is made, and then transmitting a call in accordance with an embodiment of the present invention.

FIG. 10 illustrates a procedure of establishing a call transmission and reception setup between the telephony server 103 and the telephony client 104, after a call transmission request is made, and then transmitting a call in a home network system according to an embodiment of the present invention.

Referring to FIG. 10, if a request for transmitting a call to a terminal corresponding to a telephone number input from a user is made, then the telephony client device 109 informs the CP 102 of the call transmission request in step 1000. In step 1001, the telephony client device 109 informs the telephony server device 106 of the transmission of the call. For example, the telephony client device 109 uses a UPnP event mechanism defined in the UPnP device architecture to inform the telephony server device 106 of the transmission of the call. In addition to the UPnP event mechanism defined in the UPnP device architecture, the telephony client device 109 may inform the telephony server device 106 of the transmission of the call using a unicast event mechanism or a multicast event mechanism that is also defined in the UPnP device architecture.

While informing the telephony server device 106 of the transmission of the call, the telephony client device 109 also transmits the telephone number of a call receiver to the telephony server device 106, and may transmit it to the service provider 101.

In step 1002, the CP 102 selects a telephony server and a telephony client, which are to transmit the call, from among a plurality of telephony servers and telephony clients existing on the home network, and selects a profile for transmitting the call between the selected server and client. For example, selecting a server and a client, which are to transmit the call, may be automatically preformed according to a preset policy.

In step 1003, the CP 102 establishes a call transmission and reception setup between the selected server and client. The call transmission and reception setup is established in a similar manner as described above relating to FIG. 4.

In step 1004, the CP 102 activates the call data transfer agent 111 of the telephony client 104 through the channel transport service 206 of the telephony client device 109 using UPnP Action, such as CallInitiate( ), i.e., requesting the telephony client device 109 to prepare for the transmission of the call data. In step 1005, the telephony client device 109 prepares for the transmission of the call data by preparing a file to be transmitted when the call is transmitted or opening a communication port.

In step 1006, the CP 102 activates the call data transfer agent 108 of the telephony server 103 through the channel transport service 202 of the telephony server device 106 using UPnP Action, such as CallInitiate( ), i.e., requests the telephony server device 106 to prepare for the transmission of the call data. In step 1007, the telephony server device 106 prepares for the transmission of the call data by preparing a file to be transmitted when the call is transmitted or opening a communication port, as described above.

In step 1008, the CP 102 transmits a request for starting transmitting the call to the telephony client device 109 through the channel transport service 206 of the telephony client device 109 using UPnP Action, such as StartCalldelivery( ). This request may not be made according to a policy preset by a user. For example, a user may not transmit a request starting the transmission of the call to the telephony client device 109 via the CP 102, but directly starts transmitting the call using the telephony client device 109.

In step 1009, the call control service CP 207 of the telephony client device 109 informs the telephony server device 106 of the start of transmitting the call using SendCall( ) Action, as described in relation to FIG. 4. For example, the telephony client device 109 may transmit a message for reporting the start of transmitting the call to the telephony server device 106 using a call control protocol under instructions from a user. In addition to UPnP Action, the telephony client device 109 may also transmit the message to the telephony server device 106 using a remote UI protocol, such as CEA 2014 and XRT, or an SIP protocol, which has been described in connection with the out of band protocol CCS 107.

In step 1010, the telephony server device 106 requests the service provider 101 to transmit the call data.

In step 1011, the telephony client device 109 transmits the call data input by a user to the telephony server device 106.

In step 1012, the telephony server device 106 transmits the received call data to the service provider 101.

Subsequently, if a request for terminating the transmission of the call is transmitted from a user, then the telephony client device 109 requests the CP 102 to terminate the transmission of the call, and in turn, the CP 102 requests the telephony server device 106 to terminate the transmission of the call. The telephony server device 106 then terminates the transmission of the call data. This provides an advantage in that a user can select a server and a client, which are to transmit a call, using the CP 102, and establish a call transmission and reception setup between the selected server and client.

Accordingly, the above-described embodiment of the present invention enables a user to personally input the telephone number of a call receiver when a call is transmitted. However, the telephony client 104 may alternatively receive a phone book stored in the telephony server 103, and display the phone book on a screen thereof, thereby enabling a user to search for a telephone number, to which a call is to be transmitted, from the displayed phone book and transmitting the call to the corresponding telephone number.

Figure 11:
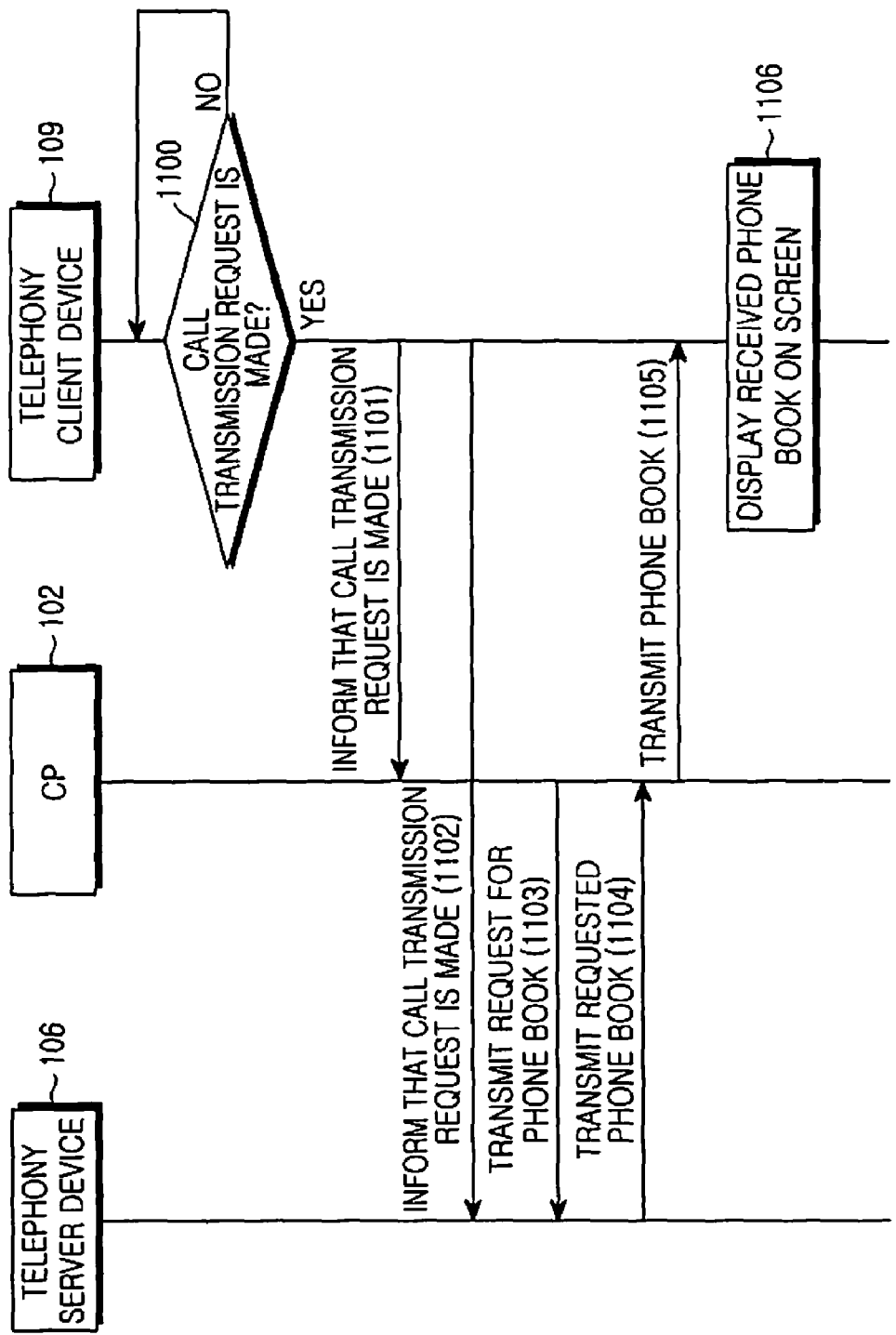
FIG. 11 is a control flowchart illustrating a procedure of displaying a phone book on a client screen, when a call is transmitted in accordance with an embodiment of the present invention.

FIG. 11 illustrates a procedure of displaying a phone book on a screen of the telephony client 104 when a call is transmitted according to an embodiment of the present invention.

Referring to FIG. 11, in step 1100, the telephony client device 109 checks if a call transmission request is made. If a call transmission request is made, the telephony client device 109, in step 1101, the telephony client device 109 informs the CP 102 of the call transmission request. Also, the telephony client device 109 informs the telephony server device 106 of the call transmission request in step 1102.

In step 1103, the CP 102 transmits a request for a phone book to the telephony server device 106 using UPnP Action, such as GetSenderInformation( ). For example, the phone book includes names, telephone numbers, addresses, and cellular phone numbers of a plurality of users.

In step 1104, the telephony server device 106 searches for the requested phone book, and transmits the searched phone book to the CP 102.

In step 1105, the CP 102 transmits the received phone book to the telephony client device 109 using UPnP Action, such as GetSenderInfomation( ).

In step 1106, the telephony client device 109 displays the received phone book, and then performs the same steps as steps 503 to 513 of FIG. 5. This provides an advantage in that a user can searches for the telephone number of a call receiver that is included in the phone book, and thus, conveniently transmit a call to the call receiver.

Figure 12:
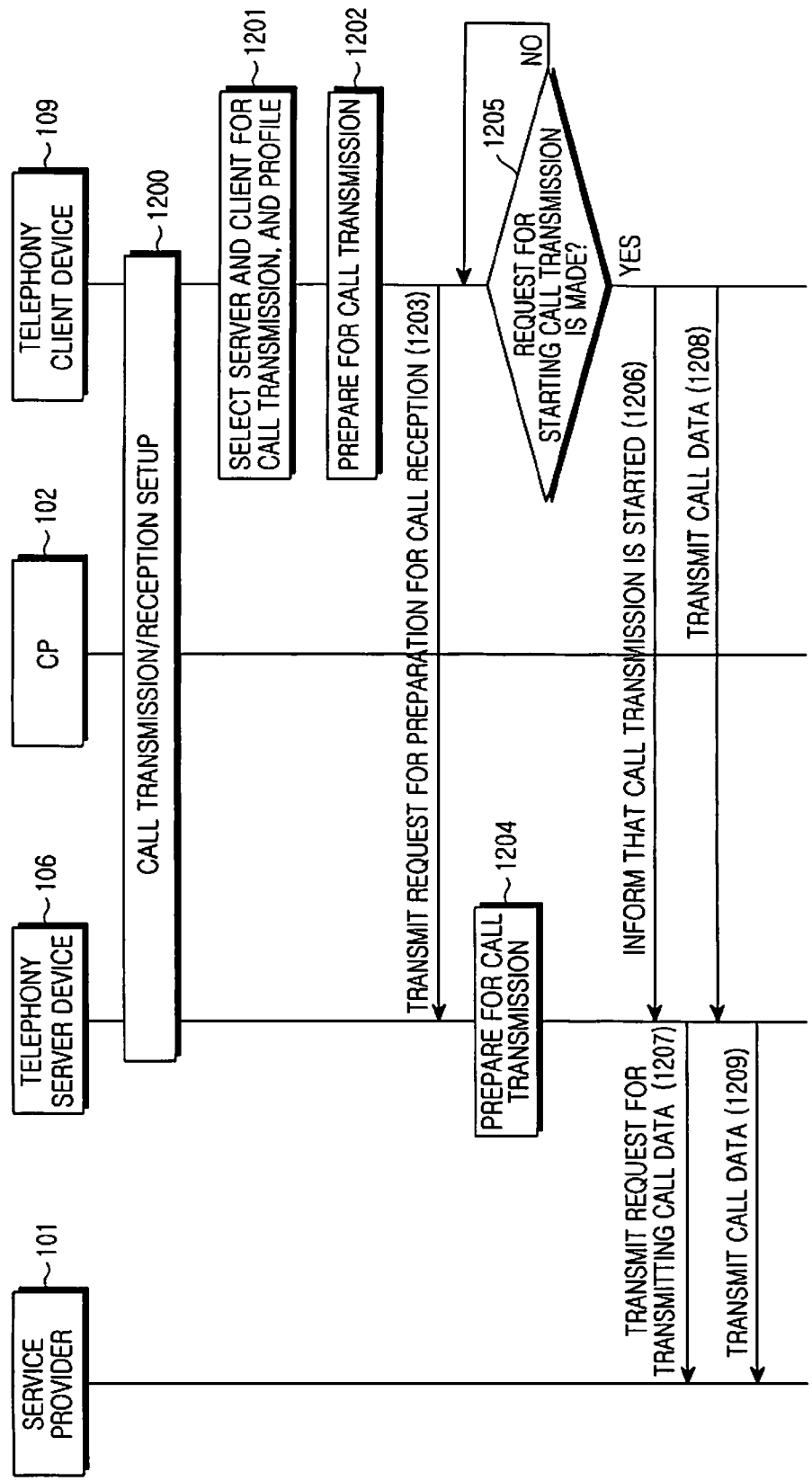
FIG. 12 is a control flowchart illustrating a procedure of establishing a call transmission/reception setup between a server and a client, before a call transmission request is made, and then transmitting a call between the server and the client, exclusive of a CP, in accordance with an embodiment of the present invention.

FIG. 12 illustrates a procedure of establishing a call transmission and reception setup, before a call transmission request is made, and then transmitting a call between the telephony server device 106 and the telephony client device 109, exclusive of the CP 102, on a home network according to an embodiment of the present invention.

Referring to FIG. 12, in step 1200, the CP 102 establishes a call transmission and reception setup between the telephony server device 106 and the telephony client device 109. Such a call transmission and reception setup is established in a manner similar to that as described with reference to FIG. 5.

Subsequently, if the CP 102 is excluded from the procedure of transmitting a call, in step 1201, the telephony client device 109 selects a server and a client which are to transmit the call, and selects a profile for transmitting the call between the selected server and client.

In step 1202, the telephony client device 109 prepares for the transmission of the call. In step 1203, the telephony client device 109 transmits call initiation notification to the telephony server device 106 using a multicast mechanism, thereby requesting the telephony server device 106 to prepare for the transmission of the call. For example, the telephony client device 109 may transmit a request for preparing for the transmission of the call to the telephony server device 106 using a unicast mechanism or UPnP Action, in addition to the multicast mechanism.

In step 1204, the telephony server device 106 prepares for the transmission of the call.

In step 1205, if a request for starting the transmission of the call is made, then the telephony client device 109 informs the telephony server device 106 of starting the transmission of the call in step 1206. Otherwise, the telephony client device 109 continues to check if a request for starting the transmission of the call is made.

The operations in subsequent steps 1207 to 1209 are the same as those in steps 1010 to 1012 of FIG. 10, which have already been described above. Accordingly, a repetitive detailed description thereof will be omitted here.

The above-described procedure provides an advantage in that a user can conveniently transmit a call using the telephony client by transmitting a call between the telephony server device 106 and the telephony client device 109, exclusive of the CP 102.

Figure 13:
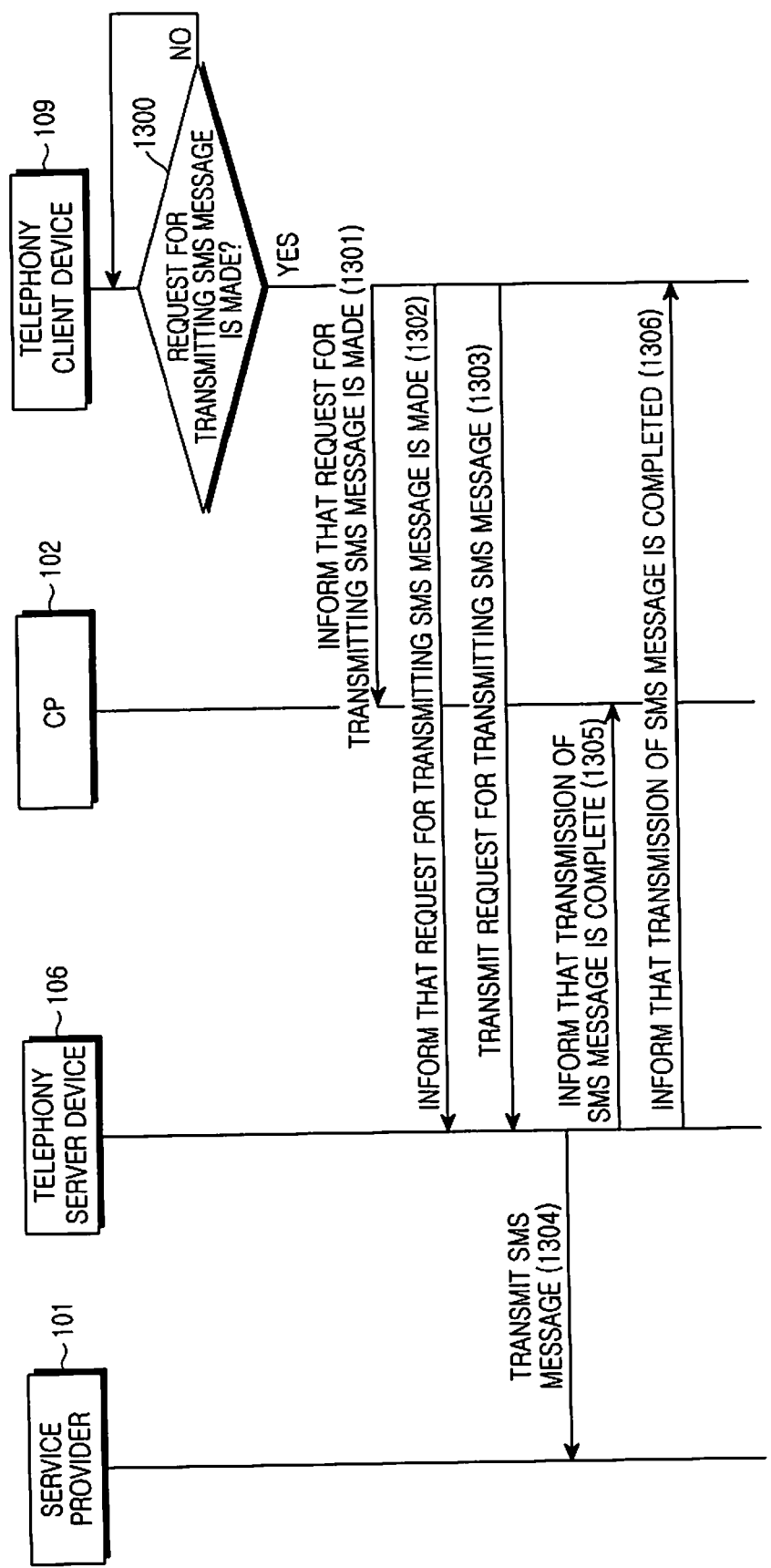
FIG. 13 is a control flowchart illustrating a procedure of transmitting an SMS message in the home network system in accordance with an embodiment of the present invention.

FIG. 13 illustrates a procedure of transmitting an SMS message in a home network system according to an embodiment of the present invention.

Referring to FIG. 13, in step 1300, the telephony client device 109 checks if a request for transmitting an SMS message written by a user is made. If such a request is made, the telephony client device 109 informs the CP 102 of the request for SMS message transmission in step 1301, and informs the telephony server device 106 of the request for SMS message transmission in step 1302 using a UPnP event mechanism. For example, the telephony client device 109 may inform the CP 102 and the telephony server device 106 of the request for SMS message transmission using a unicast event mechanism or a multicast event mechanism, in addition to the UPnP event mechanism.

In step 1303, the telephony client device 109 transmits RequestSendSMS( ) including the SMS message to the telephony server device 106 using the unicast event mechanism in order to request the telephony server device 106 to transmit the SMS message. For example, the telephony client device 109 may transmit the request for transmitting the SMS message to the telephony server device 106 using the multicast event mechanism or the UPnP event mechanism, in addition to the unicast event mechanism.

In step 1304, the telephony server device 106 transmits the received SMS message to the service provider 101. Because, in contrast with a call, an SMS message is a unidirectional message, it is difficult to confirm that the transmission of the SMS message is successfully completed. Thus, it is preferable that the telephony server device 106 informs the CP 102 of successfully completing the transmission of the SMS message using UPnP Action or the multicast event mechanism in step 1305, and informs the telephony client device 109 of successfully completing the transmission of the SMS message using UPnP Action or the multicast event mechanism in step 1306. This provides an advantage in that a user can conveniently transmit an SMS message by using a home network system.

Figure 14:
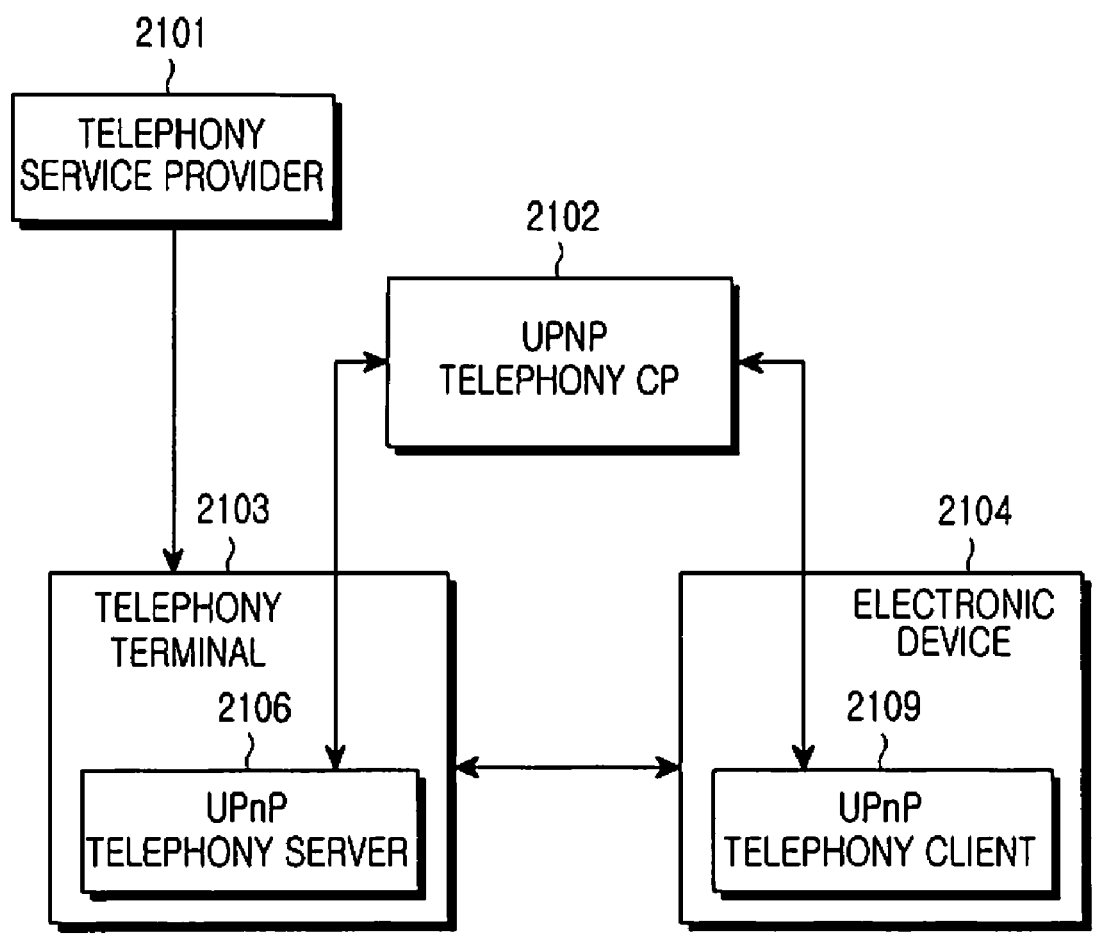
FIG. 14 is a block diagram illustrating a home network system in accordance with an embodiment of the present invention.

FIG. 14 illustrates a structure of a home network system according to an embodiment of the present invention.

Referring to FIG. 14, the home network system includes a telephony service provider 2101, a UPnP telephony Control Point (UPnP telephony CP) 2102, a telephony terminal 2103, and an electronic device 2104. The telephony service provider 2101 provides a telephony service, and provides the telephony terminal 1103 with an interface for call transmission/reception.

The UPnP telephony CP 2102 refers to a logical module for controlling a UPnP telephony server device 2106 and a UPnP telephony client device 2109 using UPnP Action. The UPnP telephony CP 2102 may be included in an apparatus, such a PC or a PDA, separate from the telephony terminal 2103 and the electronic device 2104, or may also be included in the same physical apparatus as the telephony terminal 2103 or the electronic device 2104. If the UPnP telephony CP 2102 is included inside the same physical apparatus as the telephony terminal 2103 or the electronic device 2104, then it can directly control the UPnP telephony server 2106 or the UPnP telephony client 2109 without using UPnP Action.

The UPnP telephony CP 2102 determines media, a protocol, and a transport format, which are to be used for call transmission and reception, using the capability information of a call data transfer agent included in the UPnP telephony server 2106 or the UPnP telephony client 2109, which are sent transmitted from the UPnP telephony server 2106. Also, the UPnP telephony CP 2102 generates a profile in which the determined media, protocol, and transport format are defined, and then transmits the profile to the UPnP telephony server 2106 or the UPnP telephony client 2109, thereby setting the environment of the call data transfer agent included in the UPnP telephony server 2106 or the UPnP telephony client 2109.

The telephony terminal 2103 is a physical apparatus, such as a CE apparatus (e.g., telephone), a PC including VoIP, which may consist of software, or a mobile communication terminal interworking with a communication network. The telephony terminal 2103 includes the UPnP telephony server 2106, which may consist of software. Also, the telephony terminal 2103 controls call transmission and reception using the telephony service provider 2101 and an interface provided by the corresponding telephony service provider 2101.

The electronic device 2104 is a CE apparatus capable of inputting and outputting a user voice or image, such as a mobile communication terminal or a video phone, and a physical apparatus, such as a PC or a TV. The electronic device 2104 includes the UPnP telephony client 2109, which may consist of software. Using such a home network system, a user can conveniently transmit and receive a call indoors.

Figure 15:
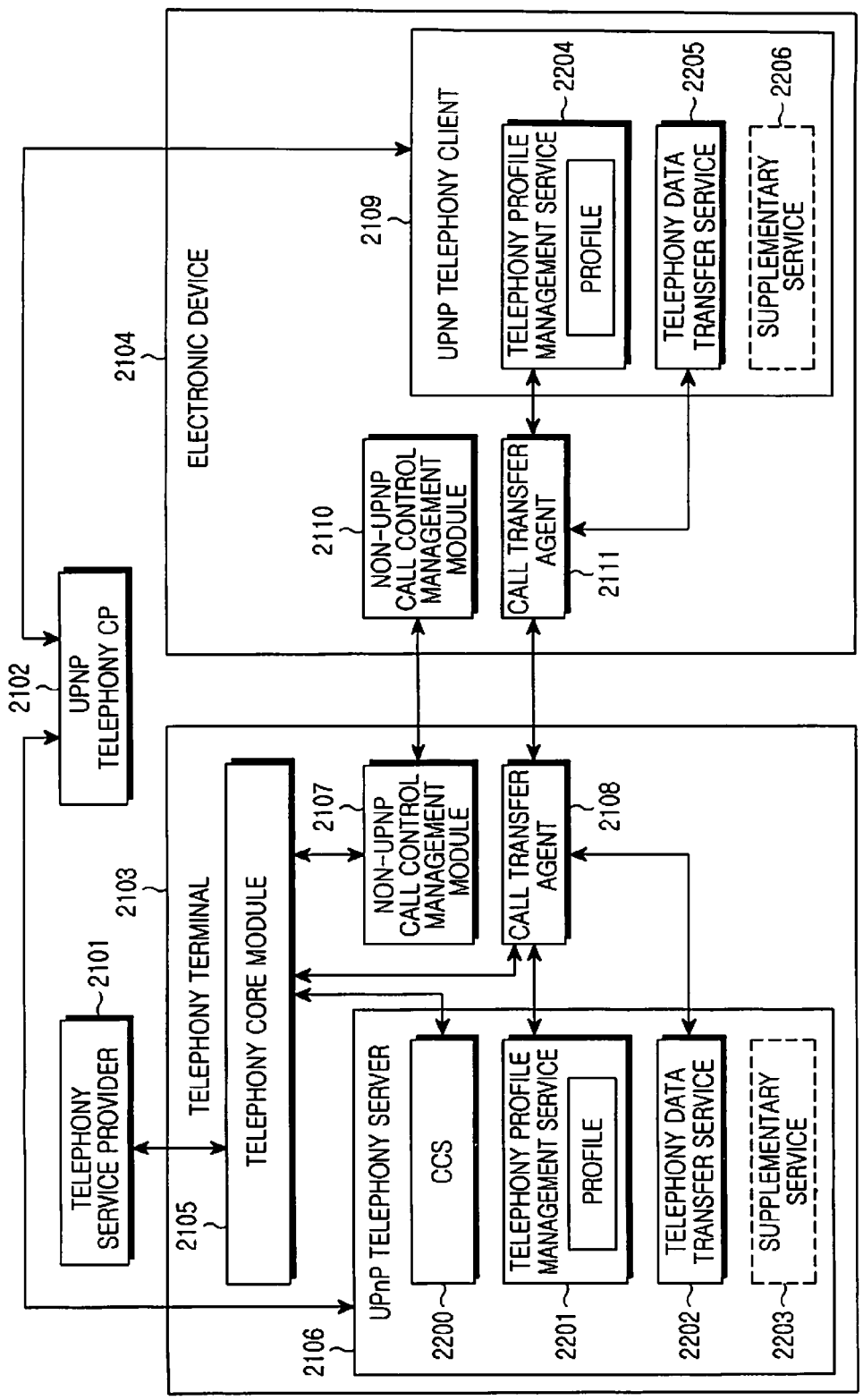
FIG. 15 is a block diagram illustrating a detailed structure of the home network system in accordance with an embodiment of the present invention.

FIG. 15 illustrates a detailed structure of a home network system according to an embodiment of the present invention.

Referring to FIG. 15, the telephony terminal 2103 includes a telephony core module 2105, the UPnP telephony server 2106, a non-UPnP call control management module 2107, and a call transfer agent 2108. The telephony core module 2105 is a module that includes typical terminal components constituting the telephony terminal 2103. The telephony core module 2105 accesses a cellular network, transmits a call transmission request, a response to a call reception request, and call data, and also performs various services provided by the telephony service provider 2101.

In accordance with an embodiment of the present invention, the telephony core module 2105 may be substituted by any module, such as VoIP, which is connected to the telephony service provider 2101 and provides a telephony service.

The UPnP telephony server 2106 includes a CCS 2200, a telephony profile management service 2201, a telephony data transfer service 2202, and a supplementary service 2203. A detailed description will be given below of the respective components of the UPnP telephony server 2106. With regard to these components, the CCS 2200, although illustrated as separate elements, the telephony profile management service 2201, and the telephony data transfer service 2202 may be formed by one call management service module.

The CCS 2200 controls the telephony core model 2105 to transmit a call transmission request, a response to a call reception request, and call data, through which it transmits information regarding a call to the telephony service provider 2101. This CCS 2200 internally control the telephony core module 2105, and the UPnP telephony CP 2102 transmits call control signals to the CCS 2200 using UPnP Action in order to control the CCS 2200. The call control signals include ringing a bell reporting call reception when a call is received, and preparing for transmitting voice data between the telephony terminal 2103 and the electronic device 2104. The call control signals include ReceiveCall( ) for informing the telephony core module 2105 of the reception of the call, SendCall( ) for informing that a call is transmitted, and transmitting the telephone number of a called party terminal to which to transmit the call, together with the call, TerminateCall( ) for informing that call transmission/reception is terminated, RequestSendSMS( ) for informing that an SMS message is transmitted, together with the SMS message, and Sendkeyvalue( ) for transferring key values generated for using various ARS services.

For example, the UPnP telephony CP 2102 can control the CCS 2200 using various UPnP Actions, and the CCS 2200 can internally control the telephony core module 2105.

The telephony profile management service 2201 provides the UPnP telephony CP 2102 with the capability of the call data transfer agent 2108 included in the telephony terminal 2103 or the electronic device 2104 in order to synchronize a data transfer protocol between the telephony terminal 2103 and the electronic device 2104. The telephony profile management service 2201 receives a profile, in which capability information to actually be used is recorded, from the UPnP telephony CP 2102, and stores the received profile. The profile includes a unique identifier of the telephony terminal 2103 or the electronic device 2104, a voice/image data codec, a data type, a communication protocol, other parameters related to image and voice transmission/reception, and information for channel transmission. Thus, the telephony profile management service 2201 can identify the telephony terminal 2103 or the electronic device 2104 using the included identifier when a call is transmitted and received.

The telephony data transfer service 2202 internally controls call transfer agents 2108 and 2111, and can start or terminate voice and image streaming between the call transfer agents 2108 and 2111 by controlling call data transmission and reception between the telephony terminal 2103 and the electronic device 2104.

When a plurality of telephony terminals 2103 or electronic devices 2104 exist on the home network, if a user selects a telephony terminal 2103 and an electronic device 2104 for a communication connection, then the telephony data transfer service 2202 transmits information on the selected telephony terminal 2103 and electronic device 2104 to the UPnP telephony CP 2202. Thus, the telephony data transfer service 2202 controls the call transfer agent 2108 to start call data transmission and reception between the selected telephony terminal 2103 and electronic device 2104, and also controls the call transfer agent 2108 to terminate the call data transmission and reception when the call data transmission and reception is to be terminated.

The supplementary service 2203 provides a answering function for enabling the electronic device 2104 to set or use an answering feature of the telephony terminal 2103, and a function of defining and setting an input type for an input apparatus and then transferring input values to the electronic device 2104 when the electronic device 2104 has no input apparatus for inputting a text. Because this supplementary service 2203 is an option module, it may be optionally included in the UPnP telephony server 2106.

The non-UPnP call control management module 2107 performs call control using remote UI protocol technology, such as CEA 2014 and XRT, or SIP protocol technology, not by using a UPnP protocol. For example, when the UPnP telephony CP 2102 does not exist, the electronic device 2104 can transmit and receive a call to and from the telephony terminal 2103 through the non-UPnP call control management module 2107. The non-UPnP call control management module 2107 is an optional module, and thus may be optionally formed in the telephony terminal.

The call transfer agent 2108 controls call data transmission and reception between the telephony terminal 2103 and the electronic device 2104. The call transfer agent 2108 transmits and receives call data using defined transport media, a defined protocol, a defined transport format, a defined voice/image codec. That is, the call transfer agent 2108 sets up a channel for data transfer between the telephony terminal 2103 and the electronic device 2104, and changes call data, which is received from the telephony core module 2105, to a codec and a data format capable of being used by the electronic device 2104 and then transfers it to the electronic device 2104 using a prearranged transfer protocol. Alternatively, the call transfer agent 2108 sets up a channel for data transfer between the telephony terminal 2103 and the electronic device 2104, and changes call data, which is received from the electronic device 2104, to a codec or a data format capable of being transferred to the telephony core module 2105 and then transfers it to the telephony core module 2105. For example, there may be multiple electronic devices 2104, and the call transfer agent 2108 may create and maintain a plurality of sessions to the respective electronic devices 2104. Here, transport media, a protocol, a transport format, and a codec used by the call transfer agent 2108 are not limited to specific technology. Therefore, the above-described embodiment of the present invention makes it possible to transmit and receive call data between the telephony terminal 2103 and the electronic device 2104 that use different data formats or codecs.

The electronic device 2104 includes the UPnP telephony client 2109 including a telephony profile management service 2204, a telephony data transfer service 2206, and a supplementary service 2206, a non-UPnP call control management module 2110, and a call transfer agent 2111. For example, the telephony profile management service 2204 and the telephony data transfer service 2206 may be formed by one media management service module.

These components included in the electronic device 2104 have the same operations as those of the components included in the telephony terminal 2103, which have been described above along with the telephony terminal 2103. Accordingly, a repetitive detailed description thereof will be omitted here.

Figure 16:
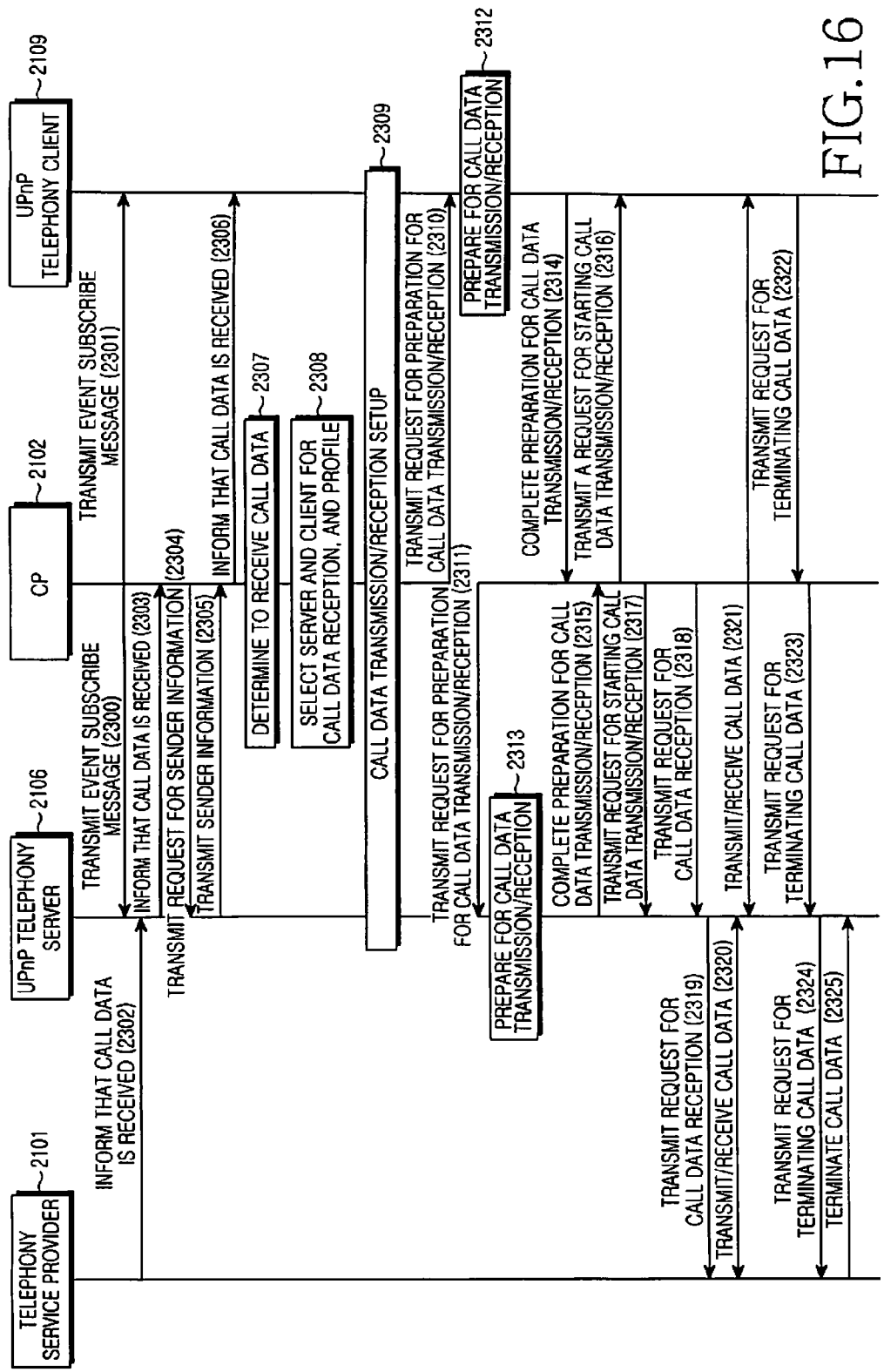
FIG. 16 is a control flowchart illustrating a procedure of receiving a call in a home network system in accordance with an embodiment of the present invention.

FIG. 16 illustrates a procedure of receiving call data on a home network system according to an embodiment of the present invention.

Referring to FIG. 16, in steps 2300 and 2301, the CP 2102 transmits a subscribe message for informing that there is a specific event to the UPnP telephony server 2106 and the UPnP telephony client 2109, respectively.

Subsequently, if call data is received, then the telephony service provider 2101 informs the UPnP telephony server 2106 of the reception of the call data in step 2302. For example, the telephony service provider 2101 may transmit its media format information together to the UPnP telephony server 2106 while informing the UPnP telephony server 2106 of the reception of the call data.

In step 2303, the UPnP telephony server 2106 informs the CP 2102 of the reception of the call data using a UPnP event mechanism defined in the UPnP device architecture. In addition to the UPnP event mechanism defined in the UPnP device architecture, the UPnP telephony server 2106 may inform the CP 2102 of the reception of the call data using a unicast event mechanism or a multicast event mechanism that is also defined in the UPnP device architecture. For example, if the UPnP telephony server 2106 receives the media format information of the telephony service provider 2101, then it transmits the received media format information together to the CP 2102, while informing the CP 2102 of the reception of the call data.

In step 2304, the CP transmits a request for sender information for the currently received call data to the UPnP telephony server 2106 using UPnP Action, such as GetSenderInformation( ). In step 2305, the UPnP telephony server 2106 transmits the requested sender information to the CP 2102. Here, the step of transmitting a request for sender information and the step of transmitting the requested sender information may be optionally performed.

In step 2306, the CP 2102 informs the UPnP telephony client 2109 of the reception of the call data, and simultaneously transmits the requested sender information together to the UPnP telephony client 2109. Here, the sender information includes the name, telephone number, profile, and schedule of a sender. Accordingly, the sender information is displayed on a screen of the UPnP telephony client 2109, so that a user can identify the sender information.

In step 2307, if a user requests the CP 2102 to determine to receive the call, the CP 2102 determines to receive the call data.

In step 2308, the CP 2102 selects a server and a client, which are to receive the call data, from among a plurality of UPnP telephony servers and UPnP telephony clients existing on the home network, and selects a profile for receiving the call data between the selected server and client. For example, selecting a server and a client to receive the call data may be automatically performed according to a preset policy.

In step 2309, the CP 2102 establishes a call data transmission and reception setup between the selected server and client. For example, the call data transmission and reception setup may be established when call data is transmitted and received, or may also be established in advance before call data is transmitted and received. For example, when the CP 2102 receives the media format information of the telephony service provider 2101 from the UPnP telephony server 2106, it may establish the call data transmission and reception setup using the received media format information.

Even in a state where a call data transmission and reception setup has been completed, when a new UPnP telephony server or a new UPnP telephony client enters a home network, an IP is newly provided to each server or client. Therefore, the UPnP telephony server or the UPnP telephony client newly establishes a call data transmission and reception setup. When a call data transmission and reception setup is newly established, a user may select a server or client for call data transmission and reception, or may select whether or not to use a previously set profile.

Also, such a call data transmission and reception setup may be automatically established according to a preset policy.

In step 2310, the CP 2102 activates the call data transfer agent 2111 through the telephony data transfer service 2205 of the of the UPnP telephony client 2109 using UPnP Action, such as CallInitiate( ), i.e., requests the UPnP telephony client 2109 to prepare for the transmission and reception of the call data.

In step 2311, the CP 2102 activates the call transfer agent 2108 through the telephony data transfer service 2202 of the of the UPnP telephony server 2106, thereby requesting the UPnP telephony server 2106 to prepare for the transmission and reception of the call data.

In step 2312, the UPnP telephony client 2109 prepares for the transmission and reception of the call data by preparing a file to be transmitted when the call data is transmitted and received or opening a communication port. For example, the UPnP telephony client 2109 may transmit a response message to the CP 2102 in response to the call data transmission and reception ready request from the CP 2102 before preparing for the transmission and reception of the call data.

In step 2313, the UPnP telephony client 2109 informs the CP 2102 that it is ready to transmit and receive the call data.

In step 2314, the UPnP telephony server 2106 prepares for the transmission and reception of the call data by preparing a file to be transmitted when the call data is transmitted/received or opening a communication port. For example, the UPnP telephony server 2106 may transmit a response message to the CP 2102 in response to the call data transmission and reception ready request from the CP 2102, before preparing for the transmission and reception of the call data.

In step 2315, the UPnP telephony server 2106 informs the CP 2102 that it is ready to transmit and receive the call data.

In step 2316, the CP 2102 transmits a request for starting transmitting and receiving the call data to the UPnP telephony client 2109 through the telephony data transfer service 2205 of the UPnP telephony client 2109 using UPnP Action, such as StartCalldelivery( ). This request may not be made according to a policy preset by a user. For example, a user may not transmit a request for starting the transmission and reception of the call data to the UPnP telephony client 2109 via the CP 2102, but directly starts transmitting and receiving the call data using the UPnP telephony client 2109.

In step 2317, the CP 2102 may transmit a request for starting transmitting and receiving the call data to the UPnP telephony server 2106, as in step 2106, and actually performs only one of these two steps.

In step 2318, the CP 2102 requests the UPnP telephony server 2106 to receive the call data. In step 2319, the UPnP telephony server 2106 requests the telephony service provider 2101 to receive the call data.

Alternatively, steps 2318 and 2319 may be performed before step 2310. That is, the CP may previously request the UPnP telephony server 2106 to receive the call data, and the UPnP telephony server 2106 may previously request the telephony service provider 2101 to receive the call data.

In step 2320, the telephony service provider and the UPnP telephony server 2106 then transmit and receive the call data to and from each other.

In step 2321, the UPnP telephony server 2106 and the UPnP telephony client 2109 transmit and receive the call data in a media format that has been determined according to the setup information established in step 2309.

Subsequently, if a request for terminating the reception of the call data is transmitted from a user, then the UPnP telephony client 2109 may transmit a request for terminating the reception of the call data to the CP 2102 in step 2322. Step 2322 may be optionally performed.

The CP 2102 transmits a requests for terminating the reception of the call data to the UPnP telephony server 2106 in step 2323, and the UPnP telephony server 2106 transmits a request for terminating the reception of the call data to the telephony service provider 2101 in step 2324. In step 2325, the telephony service provider 2101 then terminates the reception of the call data.

The above-described embodiment of the present invention provides an advantage in that a user can select a server and a client, which are to receive a call, by using the CP 2102, and establish a call transmission and reception setup between the selected server and client.

Figure 17:
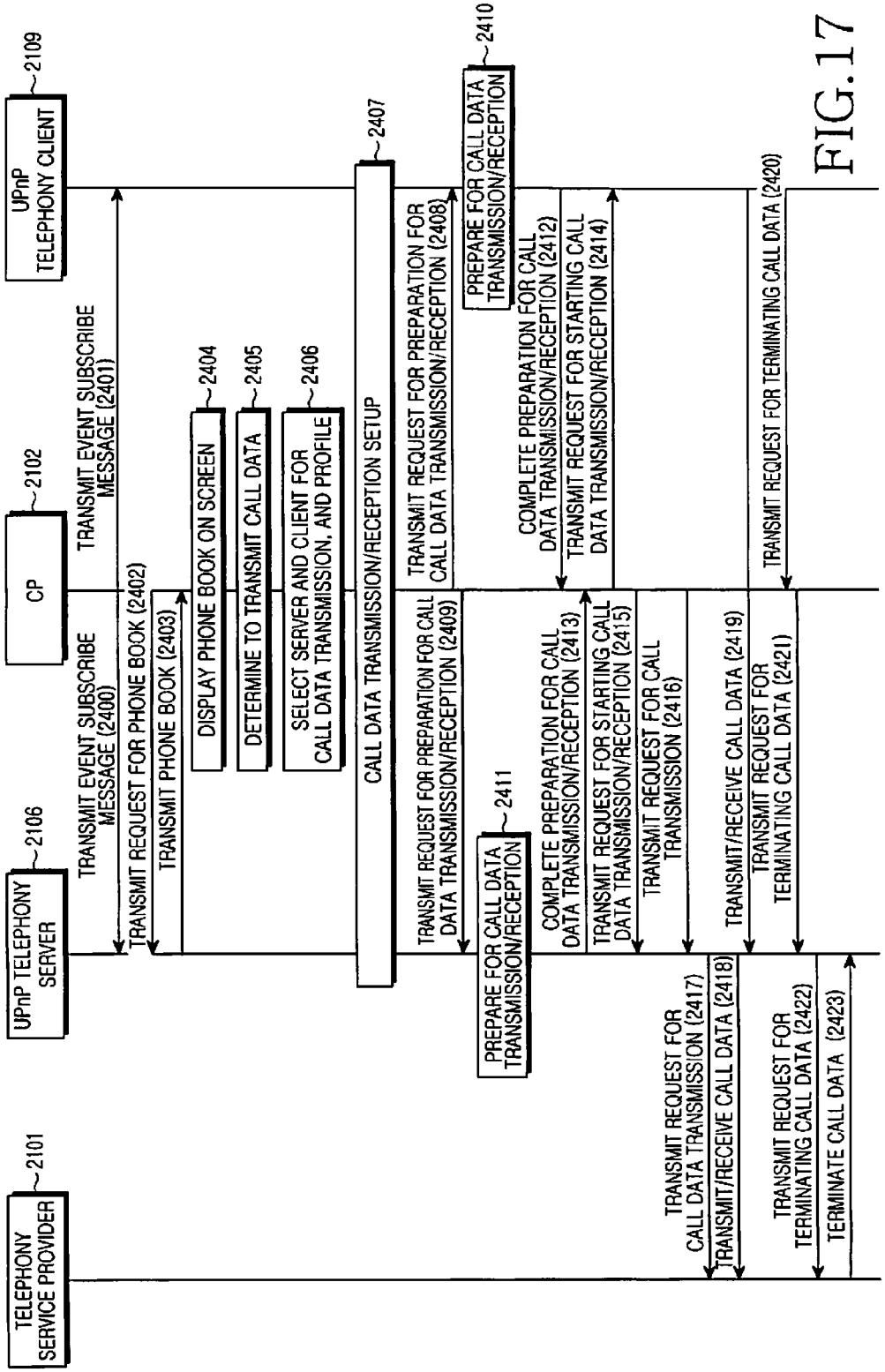
FIG. 17 is a control flowchart illustrating a procedure of transmitting a call in a home network system in accordance with an embodiment of the present invention.

FIG. 17 illustrates a procedure of transmitting call data on a home network system according to an embodiment of the present invention.

In steps 2400 and 2401, the CP 2102 transmits a subscribe message indicating that there is a specific event to the UPnP telephony server 2106 and the UPnP telephony client 2109, respectively.

In step 2402, the CP 2102 transmits a request for a phone book to the UPnP telephony server 2106 using UPnP Action, such as GetSenderInformation( ). Here, the phone book includes names, telephone numbers, addresses, cellular phone numbers of a plurality of users.

In step 2403, the UPnP telephony server 2106 searches for the requested phone book, and transmits the searched phone book to the CP 2102, and in step 2404, the CP 2102 displays the received phone book on a screen.

In step 2405, if a user requests the CP 2102 to transmit a call to any telephone number included in the phone book displayed on the screen, then the CP 2102 determines to transmit the call. However, transmitting a request for a phone book and transmitting the requested phone book may be optionally performed.

For example, this embodiment of the present invention enables a user to transmit a call using a phone book stored in the UPnP telephony server 2106, but the user may also manually input the telephone number of a call receiver.

In step 2406, the CP 2102 selects a server and a client to transmit the call from among a plurality of UPnP telephony servers and UPnP telephony clients existing on the home network, and selects a profile for transmitting the call between the selected server and client. For example, selecting a server and a client to transmit the call may be automatically performed according to a preset policy.

In step 2407, the CP 2102 establishes a call data transmission and reception setup between the selected server and client.

In step 2408, the CP 2102 activates the call transfer agent 2111 through the telephony data transfer service 2205 of the of the UPnP telephony client 2109 using UPnP Action, such as CallInitiate( ), i.e., requests the UPnP telephony client 2109 to prepare for the transmission and reception of the call data.

In step 2409, the UPnP telephony client 2109 prepares for the transmission and reception of the call data by preparing a file to be transmitted when the call data is transmitted and received or opening a communication port. For example, the UPnP telephony client may transmit a response message to the CP 2102 in response to the call data transmission/reception ready request from the CP 2102 before getting ready for the transmission/reception of the call data.

In step 2410, the CP 2102 activates the call transfer agent 2108 through the telephony data transfer service 2202 of the of the UPnP telephony server 2106, thereby requesting the UPnP telephony server 2106 to prepare for the transmission and reception of the call data.

In step 2411, the UPnP telephony client 2109 informs the CP 2102 that it is ready to transmit and receive the call data.

In step 2412, the UPnP telephony server 2106 prepares for the transmission of the call data by preparing a file to be transmitted when the call data is transmitted and received or opening a communication port, as described above. For example, the UPnP telephony server 2106 may transmit a response message to the CP 2102 in response to the call data transmission and reception ready request from the CP 2102, before preparing for the transmission and reception of the call data.

In step 2413, the UPnP telephony server 2106 informs the CP 2102 that it is ready to transmit and receive the call data.

In step 2414, the CP 2102 transmits a request for starting transmitting and receiving the call data to the UPnP telephony client 2109 through the telephony data transfer service 2205 of the UPnP telephony client 2109 using UPnP Action, such as StartCalldelivery( ).

In step 2415, the CP 2102 may transmit a request for starting transmitting and receiving the call data to the UPnP telephony server 2106, as in step 2414, and actually performs only one of these two steps. However, this request may not be made according to a policy preset by a user.

For example, a user may not transmit a request for starting the transmission and reception of the call data to the UPnP telephony client 2109 via the CP 2102, but directly starts transmitting and receiving the call data using the UPnP telephony client 2109.

In step 2416, the CP 2102 transmits a request for the transmission of the call data to the UPnP telephony server 2106, and in step 2417, the UPnP telephony server 2106 transmits the received call data transmission request to the telephony service provider 2101. The call data transmission request includes the identifier of a called party.

In step 2418, the call data is transmitted and received between the telephony service provider 2101 and the UPnP telephony server 2106.

Steps 2416 and 2417 may be performed before step 2408, and the profile information delivered at the call data transmission and reception setup is transmitted together with the call data transmission request in these two steps. This profile information is delivered to the telephony service provider 2101, and is referenced to a connection of a media session between the telephony service provider 2101 and the UPnP telephony server 2106.

In step 2419, the UPnP telephony server 2106 and the UPnP telephony client 2109 transmit and receive the call data in a media format that has been determined according to the setup information established in step 2309.

Subsequently, if a request for terminating the transmission of the call data is transmitted from a user, then the UPnP telephony client 2109 may transmit a call data transmission termination request to the CP 2102.

The CP 2102 transmits a requests for terminating the transmitting of the call data to the UPnP telephony server 2106 in step 2421, and the UPnP telephony server 2106 requests the telephony service provider 2102 to terminate the transmission of the call data in step 2422.

In step 2423, the telephony service provider 2101 terminates the transmission of the call data.

The above-described embodiment of the present invention provides an advantage in that a user can select a server and a client, which are to transmit a call, by using the CP 2102, and establish a call transmission and reception setup between the selected server and client.

Figure 18:
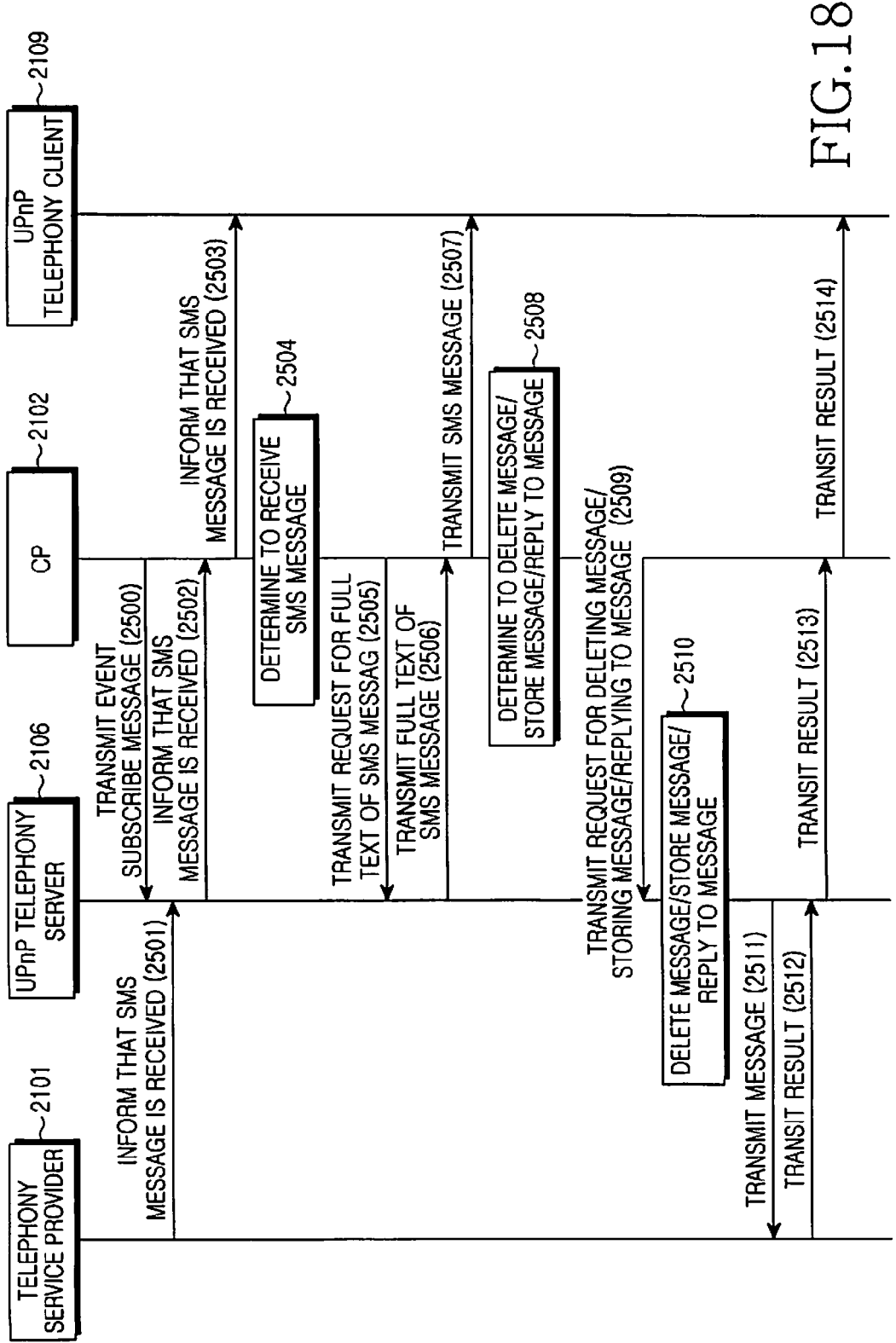
FIG. 18 is a control flowchart illustrating a procedure of receiving an SMS message in accordance with an embodiment of the present invention.

FIG. 18 illustrates a procedure of receiving an SMS message in a home network system according to an embodiment of the present invention.

In step 2500, the CP 2102 transmits a subscribe message for a specific event to the UPnP telephony server 2106.

If an SMS message is received, the telephony service provider 2101 informs the UPnP telephony server 2106 of the reception of the SMS message using a UPnP event mechanism in step 2501.

The UPnP telephony server 2106 informs the CP 2102 of the reception of the SMS message using the UPnP event mechanism in step 2502, and the CP 2102 informs the UPnP telephony client 2109 of the reception of the SMS message in step 2503.

If a user requests the CP 2102 to determine to receive the SMS message, then the CP 2102 determines to receive the SMS message in step 2504.

The CP 2102 transmits a request for the full text of the received SMS message to the UPnP telephony server 2106 in step 2505, and the UPnP telephony server 2106 transmits the requested full text of the SMS message to the CP 2102 in step 2506.

In step 2507, the CP 2102 transmits SendSMS( ) for the transmission of the SMS message to the UPnP telephony client 2109 using a unicast event mechanism.

In step 2508, the CP 2102 determines to delete the SMS message, store the SMS message, or reply to the SMS message at the request of a user. In step 2509, the CP 2102 requests the UPnP telephony server 2106 to delete the SMS message, store the SMS message, or reply to the SMS message.

At the request of the CP 2102, the UPnP telephony server 2106 deletes the SMS message, stores the SMS message, or replies to the SMS message in step 2510, and transmits a message thereabout to the telephony service 2102 in step 2511. That is, the UPnP telephony server 2106 sends an SMS message, or stores and deletes the SMS message using an interface provided by the telephony service provider 2101.

Because it may take some time to process such a request, the telephony service provider 2101 transmits a result of processing the request to the UPnP telephony server 2106 in step 2512, and the UPnP telephony server 2106 transmits the received result to the CP 2102 in step 2513. Subsequently, in step 2514, the CP 2102 transmits the result to the UPnP telephony client 2109.

Figure 19:
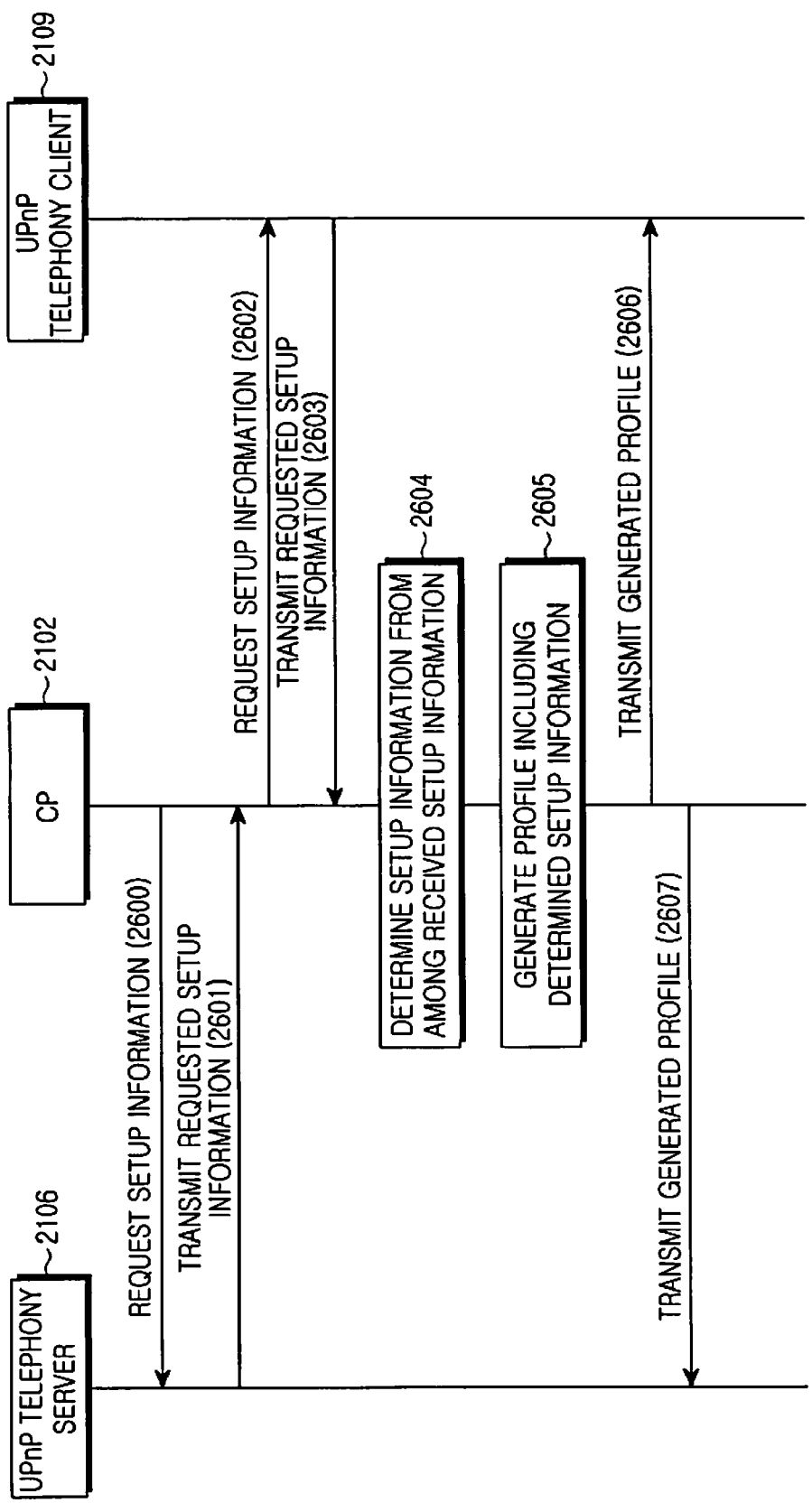
FIG. 19 is a control flowchart illustrating a procedure of establishing a call transmission/reception setup in a home network system in accordance with an embodiment of the present invention.

FIG. 19 illustrates a procedure of establishing a call transmission and reception setup between the telephony terminal 2103 and the electronic device 2104 according to an embodiment of the present invention.

In step 2600, the CP 2102 transmits a request for setup information including a protocol, a file format, and an available call control scheme, which is provided by the telephony terminal 2103, to the UPnP telephony server 2106 through the telephony profile management service 2201 of the UPnP telephony server 2106 using UPnP Action, such as GetServerProtocolInfo( ). For example, step 2600 may include a request for additional setup information when the CP 2102 receives setup information from the UPnP telephony server 2106 in step 2303 of FIG. 16, and may not be performed when there is setup information received in advance.

In step 2601, the UPnP telephony server 2106 transmits the requested setup information to the CP 2102.

In step 2602, the CP 2102 transmits a request for setup information including a protocol, a file format, and an available call control scheme, which is provided by the electronic device 2104, to the UPnP telephony client 2109 through the telephony profile management service 2205 of the UPnP telephony client 2109 using UPnP Action, such as GetClientProtocolInfo( ).

In step 2603, the UPnP telephony client 2109 transmits the requested setup information to the CP 2102.

In step 2604, the CP 2102 determines setup information to be used for call transmission and reception from among the setup information received from the UPnP telephony server 2106 and the UPnP telephony client 2109. For example, the CP 2102 may determine the setup information to be used for call transmission and reception, according to a user determination or based on a policy preset by a user or set to default.

In step 2605, the CP 2102 generates a profile including the determined setup information, and in step 2606, the CP 2102 transmits the generated profile to the telephony profile management service 2205 of the UPnP telephony client 2109 using UPnP Action, such as AddProfile( ).

In step 2607, the CP 2102 transmits the generated profile to the telephony profile management service 2201 of the UPnP telephony server 2106 using UPnP Action, such as AddProfile( ). Accordingly, it is possible to push or pull the CP 2102 to or from the UPnP telephony server 2106 and the UPnP telephony client 2109.

The above-described embodiment of the present invention has an advantage in that the above-generated profile can be transmitted to the telephony terminal 2103 or the electronic device 2104, even when a session is connected using information other than the transmitted URL.

As described above, the embodiments of the present invention have an advantage in that a call transmission and reception setup for call transmission and reception on a home network is established between a server and a client, and a call is transmitted and received between the server and the client for which the call transmission and reception setup is established, so that a user can conveniently transmit and receive a call by using apparatuses existing on a home network, in addition to a mobile communication terminal.

Further, a call is transmitted and received through a display and sound apparatus preferably having a large screen size, so that a user can identify a display for call transmission and reception on a larger screen.

Also, the embodiments of the present invention have an advantage in that a user can transmit and receive a call using a neighboring home network apparatus, even when not carrying a mobile communication terminal.

Also, the embodiments of the present invention have an advantage in that a user can directly use a home network apparatus to transmit and receive a call without using a mobile communication terminal.

While the present invention has been shown and described with reference to certain embodiments thereof, it will be understood by those skilled in the art that various changes in form and details may be made therein without departing from the spirit and scope of the present invention as defined by the appended claims and equivalents thereof.

What is claimed is:

1. A method for transmitting and receiving a call by a home network telephony Control Point (CP) using a Universal Plug and Play (UPnP) protocol, the method comprising:
    requesting a telephony server and a telephony client for media capability information;
    receiving the requested media capability information from each of the telephony server and the telephony client;
    selecting the media capability information of the telephony server and the telephony client in order to transmit and receive the call;
    establishing a connection between the telephony server and the telephony client by making reference to the selected media capability information; and
    controlling the telephony server and the telephony client between which the connection is established,
    wherein establishing the connection between the telephony server and the telephony client comprises:
    receiving call state information indicating a call state from the telephony server;
    identifying the received call state information, and then transmitting a message for media session initiation to the telephony client; and
    receiving media session information indicating a media session state from the telephony client.

2. The method as claimed in claim 1, further comprising, when receiving the call, receiving an event informing of call reception from the telephony server before requesting the telephony server and the telephony client for the media capability information.

3. The method as claimed in claim 1, wherein controlling the telephony server and the telephony client between which the connection is established comprises controlling any one of media transmission initiation, media session modification, and media transmission termination between the telephony server and the telephony client between which the connection is established.

4. A method for providing a home network telephony service by using a Universal Plug and Play (UPnP) protocol, the method comprising:
    transmitting a request for media capability information from a telephony Control Point (CP) to a telephony server and a telephony client;
    transmitting the requested media capability information from the telephony server and the telephony client to the telephony CP;

upon receiving the requested media capability information by the telephony CP, selecting the media capability information of the telephony server and the telephony client in order to transmit and receive a call;

establishing a connection between the telephony server and the telephony client by making reference to the selected media capability information by the telephony CP; and controlling the telephony server and the telephony client, between which the connection is established, by the telephony CP, wherein establishing the connection between the telephony server and the telephony client comprises:

transmitting call state information indicating a call state to the telephony CP;

upon receiving the call state information by the telephony CP, identifying the received call state information, and then transmitting a message for media session initiation to the telephony client;

upon receiving the message for media session initiation by the telephony client, starting to transmit and receive a media stream;

transmitting media session information indicating a media session state from the telephony client to the telephony CP; and receiving the media session information by the telephony CP.

5. The method as claimed in claim 4, further comprising:

when receiving the call, recognizing call reception by the telephony server, and transmitting an event informing of the call reception from the telephony server to the telephony CP before transmitting the request for the media capability information from the telephony CP to the telephony server and the telephony client; and receiving the event informing of the call reception by the telephony CP.

6. The method as claimed in claim 4, wherein controlling the telephony server and the telephony client between which the connection is established comprises controlling any one of media transmission initiation, media session modification, and media transmission termination between the telephony server and the telephony client, between which the connection is established, by the telephony CP.

7. A home network telephony Control Point (CP) using a Universal Plug and Play (UPnP) protocol, the home network telephony CP comprising:

request means for requesting a telephony server and a telephony client for media capability information;

reception means for receiving the requested media capability information from each of the telephony server and the telephony client;

selection means for selecting the media capability information of the telephony server and the telephony client in order to transmit and receive a call;

establishment means for establishing a connection between the telephony server and the telephony client by using the selected media capability information; and control means for controlling the telephony server and the telephony client between which the connection is established, wherein the establishment means receives call state information indicating a call state from the telephony server, identifies the received call state information, transmits a message for media session initiation to the telephony client, and then receives media session information indicating a media session state from the telephony client.

8. The home network telephony CP as claimed in claim 7, wherein, when the call is received, the reception means receives an event informing of call reception from the telephony server before requesting the telephony server and the telephony client for the media capability information.

9. The home network telephony CP as claimed in claim 7, wherein the control means controls any one of media transmission initiation, media session modification, and media transmission termination between the telephony server and the telephony client between which the connection is established.

10. A home network telephony server using a Universal Plug and Play (UPnP) protocol, the home network telephony server comprising:

a telephony server management service unit for receiving a request for media capability information from a telephony Control Point (CP), transmitting the requested media capability information to the telephony CP, and allowing the telephony CP to establish a connection to a telephony client; and a telephony server transmission service unit for allowing the telephony CP to control the home network telephony server together with the telephony client to which the connection is established, wherein the telephony CP, upon receiving call state information indicating a call state, identifies the received call state information, transmits a message for media session initiation to the telephony client, and then receives media session information indicating a media session state from the telephony client.

11. The home network telephony server as claimed in claim 10, further comprising a telephony server call control service unit for, when receiving a call, recognizing call reception and transmitting an event informing of the call reception to the telephony CP before receiving the request for the media capability information.

12. The home network telephony server as claimed in claim 10, wherein the telephony server management service unit receives a message for call preparation from the telephony CP, and transmits call state information indicating a call state to the telephony CP.

13. The home network telephony server as claimed in claim 10, wherein the telephony server transmission service unit allows the telephony CP to control any one of media transmission initiation, media session modification, and media transmission termination to the telephony client to which the connection is established.

14. A home network telephony client using a Universal Plug and Play (UPnP) protocol, the home network telephony client comprising:

a telephony client management service unit for receiving a request for media capability information from a telephony Control Point (CP), transmitting the requested media capability information to the telephony CP, and allowing the telephony CP to establish a connection to a telephony server; and a telephony client transmission service unit for allowing the telephony CP to control the home network telephony client together with the telephony server to which the connection is established, wherein the telephony CP, upon receiving call state information indicating a call state, identifies the received call state information, transmits a message for media session initiation to the telephony client, and then receives media session information indicating a media session state from the telephony client.

15. The home network telephony client as claimed in claim 14, further comprising a telephony client call control service unit for, when receiving a call, transmitting an event informing of the call reception to the telephony CP before receiving the request for the media capability information.

16. The home network telephony client as claimed in claim 14, wherein, upon receiving a message for media session initiation from the telephony CP, the telephony client management service unit starts to transmit and receive a media stream, and transmits media session information indicating a media session state to the telephony CP.

17. The home network telephony client as claimed in claim 14, wherein the telephony client transmission service unit allows the telephony CP to control any one of media transmission initiation, media session modification, and media transmission termination to the telephony server to which the connection is established.

18. A system for providing a home network telephony service by using a Universal Plug and Play (UPnP) protocol, the system comprising:
   a telephony server and a telephony client for transmitting media capability information to a telephony Control Point (CP) at a request of the telephony CP, allowing the telephony CP to establish a connection between the telephony server and the telephony client, and being controlled by the telephony CP; and
   the telephony CP for requesting the telephony server and the telephony client for the media capability information; upon receiving the requested media capability information, selecting the media capability information of the telephony server and the telephony client in order to transmit and receive the call, establishing the connection between the telephony server and the telephony client by making reference to the selected media capability information, and controlling the telephony server and the telephony client between which the connection is established,
   wherein the telephony CP, upon receiving call state information indicating a call state, identifies the received call state information, transmits a message for media session initiation to the telephony client, and then receives media session information indicating a media session state from the telephony client.

19. The system as claimed in claim 18, wherein, when a call is received, the telephony server recognizes call reception and transmits an event informing of the call reception to the telephony CP before the telephony CP requests the telephony server and the telephony client for the media capability information, and the telephony CP receives the event informing of the call reception.

20. The system as claimed in claim 19, wherein the telephony server receives a message for call preparation from the telephony CP, and transmits call state information indicating a call state to the telephony CP.

21. The system as claimed in claim 19, wherein, upon receiving a message for media session initiation, the telephony client starts to transmit and receive a media stream, and transmits media session information indicating a media session state to the telephony CP.

22. The system as claimed in claim 18, wherein the telephony CP controls any one of media transmission initiation, media session modification, and media transmission termination between the telephony server and the telephony client between which the connection is established.

* * * * *